United States Patent
Divorra Escoda et al.

(10) Patent No.: US 8,363,936 B2
(45) Date of Patent: Jan. 29, 2013

(54) METHOD AND APPARATUS FOR REDUCED RESOLUTION PARTITIONING

(75) Inventors: Oscar Divorra Escoda, Princeton, NJ (US); Peng Yin, West Windsor, NJ (US)

(73) Assignee: Thomson Licensing, Boulogne, Billancourt (FR)

( * ) Notice: Subject to any disclaimer, the term of this patent is extended or adjusted under 35 U.S.C. 154(b) by 843 days.

(21) Appl. No.: 12/310,090

(22) PCT Filed: Aug. 16, 2007

(86) PCT No.: PCT/US2007/018027
§ 371 (c)(1),
(2), (4) Date: Feb. 10, 2009

(87) PCT Pub. No.: WO2008/027192
PCT Pub. Date: Mar. 6, 2008

(65) Prior Publication Data
US 2009/0196517 A1    Aug. 6, 2009

Related U.S. Application Data

(60) Provisional application No. 60/823,567, filed on Aug. 25, 2006.

(51) Int. Cl.
*G06K 9/00* (2006.01)
(52) U.S. Cl. .................................................. 382/167
(58) Field of Classification Search .......... 382/232–233, 382/235–236, 238–240, 248, 251; 348/394.1–395.1, 348/398.1, 403.1, 404.1, 407.1–408.1, 420.1; 375/240.11, 240.12, 240.18–240.25
See application file for complete search history.

(56) References Cited

U.S. PATENT DOCUMENTS

| | | | |
|---|---|---|---|
| 5,999,657 A * | 12/1999 | Yasuhiko | 382/248 |
| 6,546,143 B1 * | 4/2003 | Taubman et al. | 382/240 |
| 6,633,611 B2 | 10/2003 | Sekiguchi et al. | |
| 6,778,709 B1 * | 8/2004 | Taubman | 382/240 |
| 7,154,952 B2 * | 12/2006 | Tourapis et al. | 375/240.16 |
| 7,212,573 B2 * | 5/2007 | Winger | 375/240.12 |
| 7,302,006 B2 * | 11/2007 | Apostolopoulos et al. | 375/240.24 |
| 7,545,293 B2 * | 6/2009 | Reznik | 341/67 |
| 2004/0081238 A1 | 4/2004 | Parhy | |

FOREIGN PATENT DOCUMENTS

| | | |
|---|---|---|
| JP | 11-164305 | 6/1999 |
| WO | 2005/093661 A2 | 10/2005 |

OTHER PUBLICATIONS

Huipin Zhang et al., "Region-based coding of motion fields for low-bitrate video compression" Image Processing, 2004, ICIP 04, 2004 International Conference on Sinapore Oct. 24-27, 2004, Piscataway, NJ, USA, IEEE, 24 Oct. 24, 2004, pp. 1117-1120, XP010785203 ISBN: 0-7803-8554-3.

Karczewicz M. et al.: "Video coding using motion compensation with polynomial motion vector fields" Signal Processing. Image Communication, Elsevier Science Publishers, Amsterdam, NL, vol. 10, No. 1-3, Jul. 1997, pp. 63-91 XP004082702 ISSN: 0923-5965, p. 68, last paragraph-p. 69 paragraph 1.

Tourapis A. M.: "Reduced Resolution Update Mode for Advanced Video Coding (VCEG-VO5 VCEG-VO5.doc)" ITU-T Video Coding Experts Group (ITU-T SG16 Q.6) 22$^{nd}$ Meeting, Mar. 15, 2004, XP030003411 Munich, DE.

(Continued)

*Primary Examiner* — Jose Couso
(74) *Attorney, Agent, or Firm* — Robert D. Shedd; Guy H. Eriksen

(57) ABSTRACT

There are provided methods and apparatus for reduced resolution partitioning. An apparatus includes an encoder for encoding video data using adaptive tree-based frame partitioning, wherein partitions are obtained from a combination of top-down tree partitioning and bottom-up tree joining.

71 Claims, 9 Drawing Sheets

OTHER PUBLICATIONS

De Forni R. et al.: "On the Benefits of Leaf Merging in Quad-Tree Motion Models" Image Processing, 2005, ICIP 2005. IEEE International Conference on Genova, Italy Sep. 11-14, 2005, Piscataway, NJ, USA, IEEE, Sep. 11, 2005 pp. 858-861, XP010851189 ISBN: 0-7803-9134-9.

Schwarz, H., Wiegand, T.: "Tree-structured macroblock partition (VCEG-017 VCEG-017.doc)" ITU Video Coding Experts Group Study Group 16 Question 6 15th Meeting, Dec. 4, 2001,XP0030003350 Pattaya, TH.

Tien-Ying Kuo et al.: "Fast macroblock partition prediction for H.264/AVC" Multimedia and Expo, 2004. ICME 04, 2004 IEEE International Conference on Taipei, Taiwan Jun. 27-30, 2004, Piscataway, NJ, USA, IEEE vol. 1, Jun. 27, 2004, pp. 675-678, XP010770901 ISBN: 0-7803-8603-5.

Jungwood Lee Ed ' Institute of Electrical and Electronics Engineers: "Optimal quadtree for variable block size motion estimation" Proceedings of the International Confernce on Image Processing. (ICIP). Washington, Oct. 23-26, 1995, Los Alamitos, IEEE Comp. Soc. Press, US, vol. 3, Oct. 23, 1995, pp. 480-483, XP010197226 ISBN: 0-7803-3122-2.

ITU-T Telecommunication Standardization Sector of IUT: Series H. Audiovisual and Multimedia Systems Infrastructure of Audiovisual services—Coding of moving video: Advanced video coding for generic audiovisual services ITU-T Recommendation H.264.

Tourapis et al. ITU-T Video Coding Experts Group (ITU-TSG16 Q.6) 12th meeting : Redmond, Washington USA Jul. 19-23, 2004 "New Results on Reduced Resolution Update Mode" pp. 1-15.

* cited by examiner

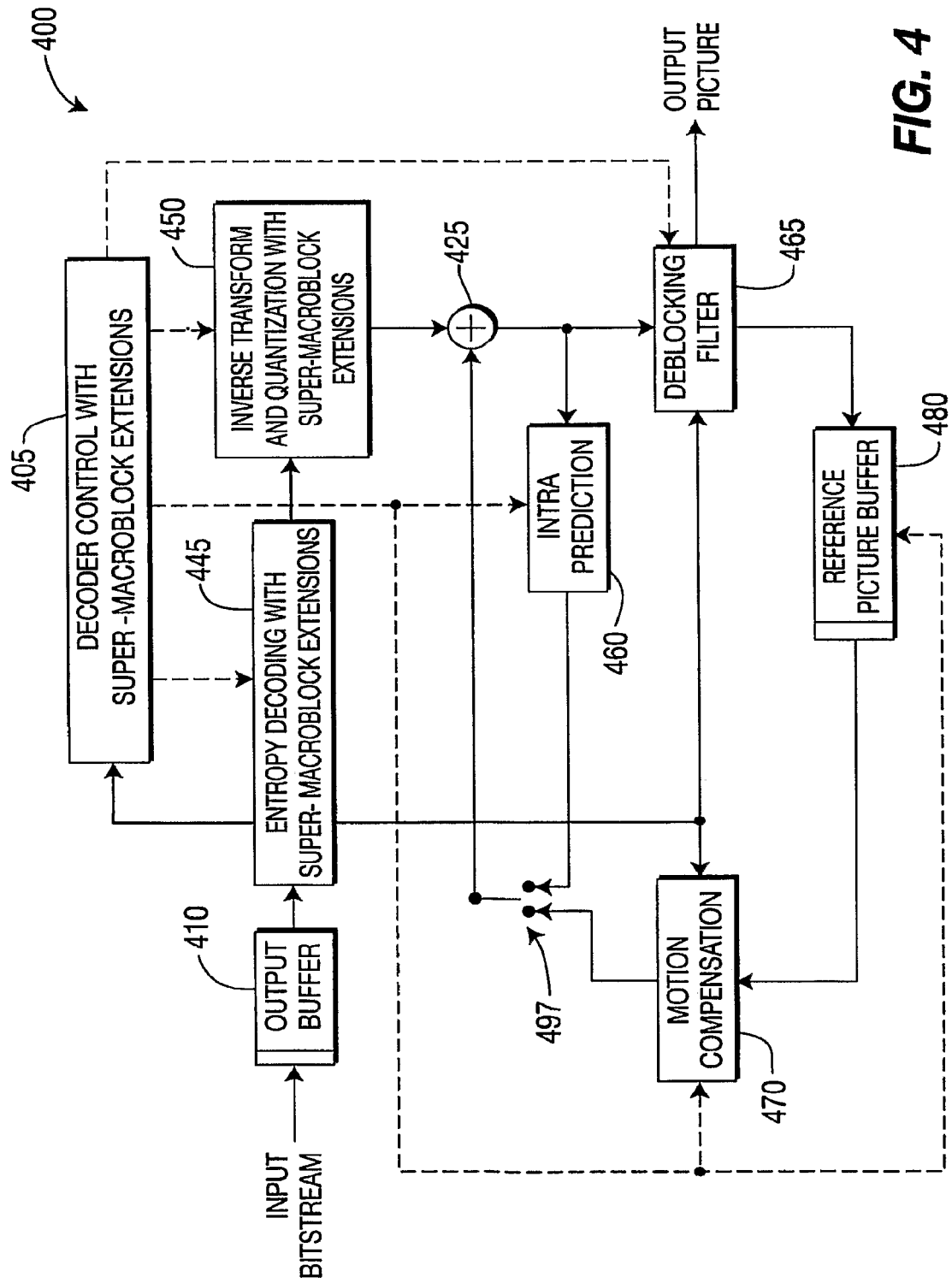

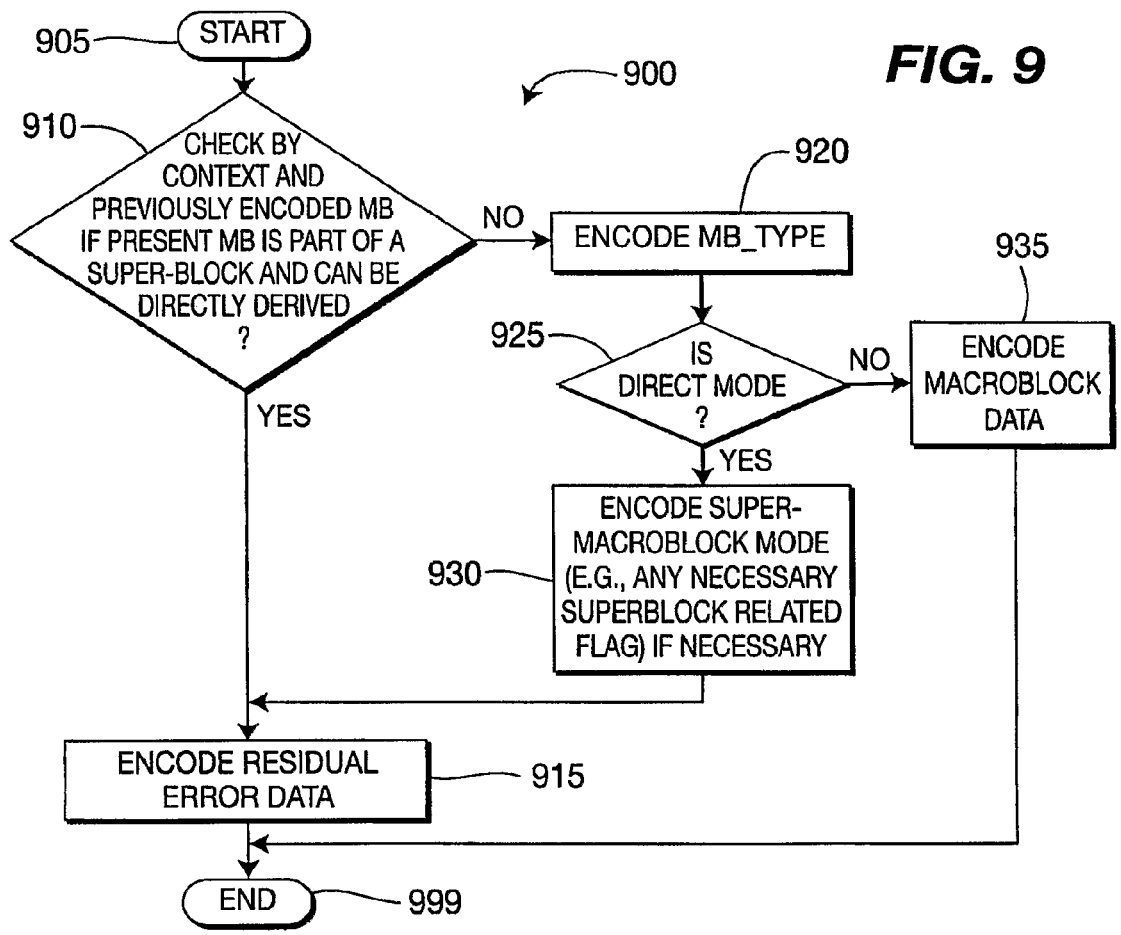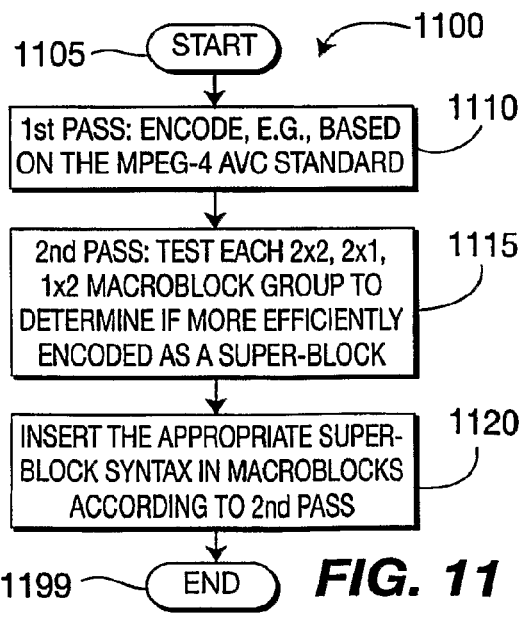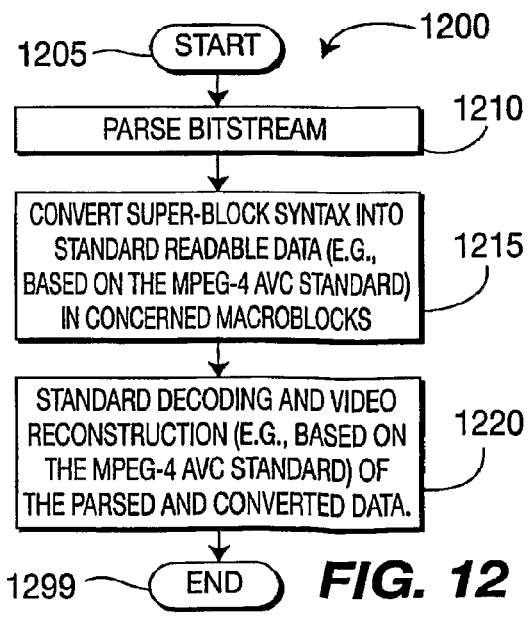

METHOD AND APPARATUS FOR REDUCED RESOLUTION PARTITIONING

CROSS-REFERENCE TO RELATED APPLICATIONS

This application is a National Stage Application and claims the benefit, under 35 U.S.C. §365 of International Application PCT/US2007/018027 filed Aug. 16, 2007, which was published in accordance with PCT Article 21(2) on Mar. 6, 2008 in English, and which claims the benefit of U.S. Provisional Patent Application No. 60/823,567 filed on Aug. 25, 2006.

TECHNICAL FIELD

The present principles relate generally to video encoding and decoding and, more particularly, to methods and apparatus for reduced resolution partitioning.

BACKGROUND

State of the art video coders use adaptive block partitioning in order to best classify visual data for efficient coding. For this purpose most coding algorithms divide each frame on a uniform grid of blocks of a given size (macroblocks), and then, depending on the video data, they further divide each block into smaller partitions in order to best adapt to video data. An inherent limitation of this approach is that, in state of the art standards (such as the International Organization for Standardization/International Electrotechnical Commission (ISO/IEC) Moving Picture Experts Group-4 (MPEG-4) Part 10 Advanced Video Coding (AVC) standard/international Telecommunication Union, Telecommunication Sector (ITU-T) H.264 recommendation (hereinafter the "MPEG-4 AVC standard"), the size of the blocks from the initial grid is fixed and is independent on the type of content being encoded. Depending on the content, the video resolution and/or the desired compression, the initial grid prefixed block size, may be appropriate. However, and in most of the cases, there is a great variety of situations where this initial grid prefixed block-size will limit the maximum possible achievable efficiency. Indeed, signal structures (e.g., areas with a similar or equal motion) bigger than the initial grid block-size cannot be identified and jointly encoded. Typically, such use of bigger areas for coding may be of interest when coding high resolution content at low and/or middle rates. Indeed, one would like to find the best distortion-coding cost optimized compression method for areas as big as possible, in order to reduce possible signal redundancy as much as possible. As a possible solution, one may decide to simply set a bigger size for the initial block used to initialize the tree frame partitioning when needed. Hence, as previously proposed in the case of the MPEG-4 AVC Standard, this would be equivalent to eventually doubling the dimensions of block modes. However, this implies that the smallest blocks size is lost, and consequently, adaptation capacity for very small detail is reduced. Another possibility could be, in addition to doubling the dimensions of block modes (hereinafter the "first case"), to also increase the depth of the coding tree (hereinafter the "second case"). In any of these two cases, a major problem arises, in that coding and decoding architectures need to follow major transformations in order to adapt them to the new initial block size. Hence, this calls for a full re-design of the encoding/decoding system when different families of block sizes are desired. In the second case, in addition, smaller size block coding modes will probably be penalized in terms of information cost, having a negative impact in low resolution sequences that cannot profit from the biggest introduced partitions. Indeed, in a "general purpose" encoder used for a large range of resolutions, one is interested in being able to use additional frame partition types when necessary and not to consider them when unnecessary in order to spare bits. This requires a flexible way of enabling or disabling certain frame partition sizes.

The use of different block partition sizes has been progressively introduced into video coding approaches in order to achieve efficient compression. At first, video standards and/or recommendations, for example, previous to the International Telecommunication Union, Telecommunication Sector (ITU-T) H.263 recommendation (hereinafter the "H.263 Recommendation"), mostly used single size-based frame partitioning (i.e., most typically with block size of 16×16). Adaptive frame partitioning was introduced within the H.263 Recommendation family in order to increase compression efficiency (8×8 blocks could be also considered apart from 16×16 ones). Partitioning was introduced based on a tree structured set of partitions. The use of adaptive, tree-based, frame partitioning was consolidated in the MPEG-4 AVC Standard by means of a large set of possible partitions: 16×16; 16×8; 8×16; 8×8; 8×4; 4×8; and 4×4. In some occasions, there is the need of using bigger partitions than 16×16 in order to "pack" and code information in a more efficient way. One method of doing this is addressed by a first prior art approach, where depending on the need, a reduced resolution partitioning of frames is eventually used by doubling the size of all possible partitions. For example, according to the first prior art approach, all 16×16 and 8×8 modes in the MPEG4 AVC Standard would be modified such that they work as 32×32 and 16×16 modes, respectively. This approach has two primary problems. The first problem is that encoder and decoder implementations typically need to be redesigned to cope with such a structural change. The second problem is that a loss in partition resolution is produced.

A more general way of generating arbitrary shape partitions out of an initial tree-based partitioning, such as the one produced by the MPEG-4 AVC Standard, is addressed in a second prior art approach. In accordance with the second prior art approach, additional syntax data is sent for every block and sub-block in order to indicate whether that block is jointly coded with a neighbor or coded individually (eventually, the neighbor selected for joint coding is indicated as well). This approach, even if it is very flexible, has the following main drawbacks/disadvantages. On such drawback/disadvantage is that the second prior art approach tries to generate arbitrarily shaped regions by means of block merging. Hence, additional data needs to be transmitted for every one of the blocks or sub-blocks within the frame having at least one neighbor to merge with. This makes the signaling complicated and, in some applications, such an amount of partition possibilities can be simply over-whelming. This also introduces unnecessary overhead. Another such drawback/disadvantage is that the second prior art approach loses the hierarchical structure of partitions after merging and does not handle "super-macroblock-like" partitions. Yet another drawback/disadvantage is that the second prior art approach needs to code each macroblock type mode as it does not impose a hierarchical structure of partitions.

Direct prediction modes can be seen as a way of extending the use of motion information from a single block, into bigger regions, as if the blocks involving the bigger region where coded together. However, motion information is not optimized considering the whole region at the encoder side. Moreover, shape and structure of directly predicted regions based on Direct Prediction modes is uncontrolled. Indeed, relationships between different blocks, or macroblocks, depends on the typically used motion median predictor and do not necessarily keep a hierarchical structure.

Turning to FIG. 1, a video encoder capable of performing video encoding in accordance with the MPEG-4 AVC standard is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, an input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

A first output of the picture-type decision module 115 is connected in signal communication with a third input of a frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and with an inverting input of the combiner 185.

Inputs of the frame ordering buffer 110 and the encoder controller 105 are available as input of the encoder 100, for receiving an input picture 101. Moreover, an input of the Supplemental Enhancement Information (SEI) inserter 130 is available as an input of the encoder 100, for receiving metadata. An output of the output buffer 135 is available as an output of the encoder 100, for outputting a bitstream.

Turning to FIG. 2, a video decoder capable of performing video decoding in accordance with the MPEG-4 AVC standard is indicated generally by the reference numeral 200.

The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270 and a first input of the deblocking filter 265. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, with a first input of the motion compensator 270, and with a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

SUMMARY

These and other drawbacks and disadvantages of the prior art are addressed by the present principles, which are directed to methods and apparatus for reduced resolution partitioning.

According to an aspect of the present principles, there is provided an apparatus. The apparatus includes an encoder for encoding video data using adaptive tree-based frame partitioning, wherein partitions are obtained from a combination of top-down tree partitioning and bottom-up tree joining.

According to another aspect of the present principles, there is provided a method. The method includes encoding video data using adaptive tree-based frame partitioning, wherein partitions are obtained from a combination of top-down tree partitioning and bottom-up tree joining.

According to yet another aspect of the present principles, there is provided an apparatus. The apparatus includes a decoder for decoding video data using adaptive tree-based frame partitioning, wherein partitions are obtained from a combination of top-down tree partitioning and bottom-up tree joining.

According to still another aspect of the present principles, there is provided a method. The method includes decoding video data using adaptive tree-based frame partitioning, wherein partitions are obtained from a combination of top-down tree partitioning and bottom-up tree joining.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 4 shows a block diagram for a video decoder capable of performing video decoding in accordance with the MPEG-4 AVC Standard, modified and/or extended for use with the present principles, according to an embodiment of the present principles;

FIG. 9 shows a flow diagram for an exemplary method for encoding a macroblock in accordance with method B, according to an embodiment of the present principles;

FIG. 11 shows a flow diagram for an exemplary method for encoding video data using a two-pass encoder, according to an embodiment of the present principles; and FIG. 12 shows a flow diagram for an exemplary method for decoding video data, according to an embodiment of the present principles.

DETAILED DESCRIPTION

Figure 1:
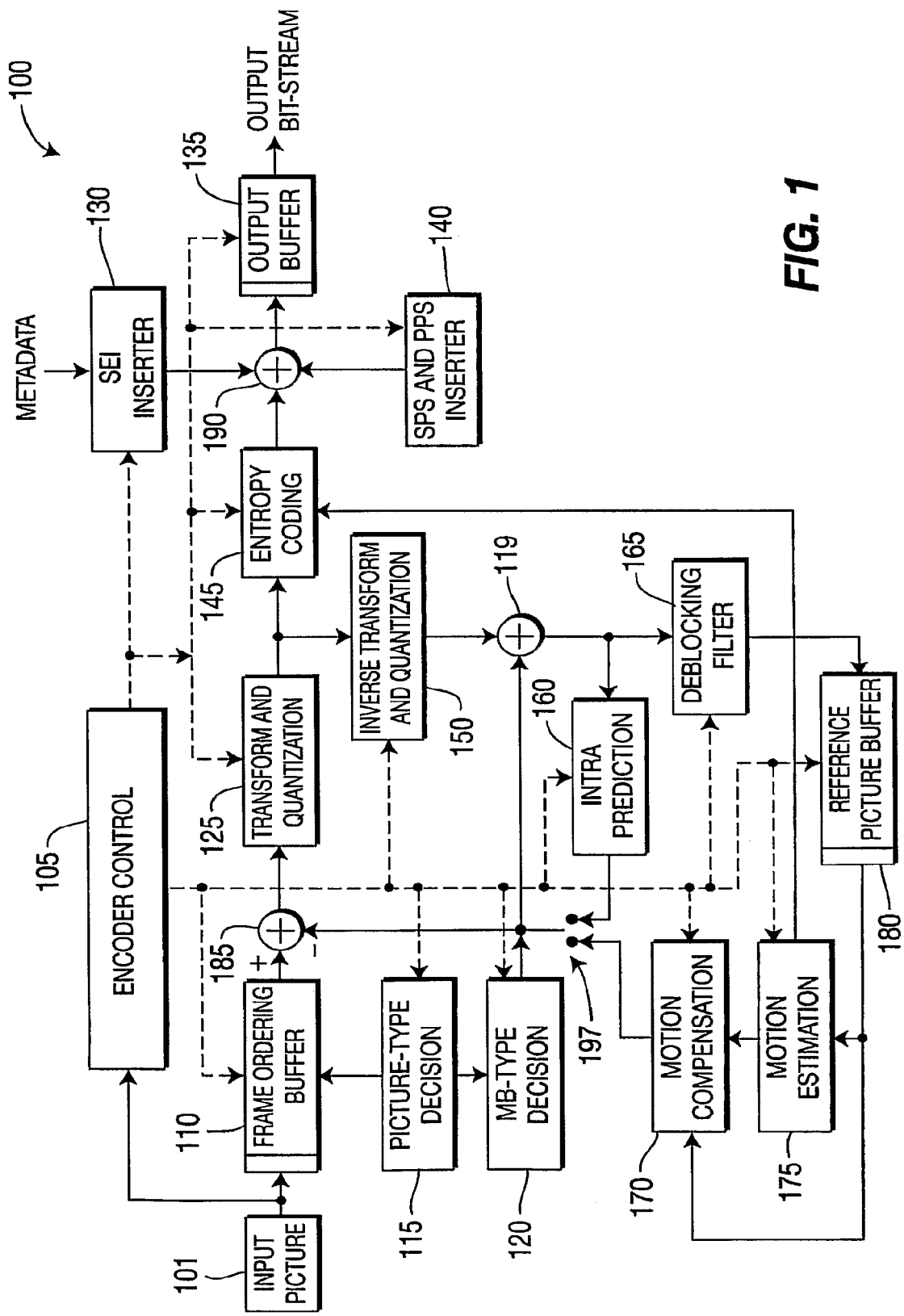
FIG. 1 shows a block diagram for a video encoder capable of performing video encoding in accordance with the MPEG-4 AVC Standard.

The present principles are directed to methods and apparatus for reduced resolution partitioning.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, picture parameter set level, sequence parameter set level and NAL unit header level.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Further, as used herein, "direct modes" refer to block modes where motion information is directly inferred from the neighboring blocks in space and/or time using at least one predefined derivation or motion prediction rule. In the event of the existence or availability of several rules, some syntax at any level can be used to select a particular derivation/prediction motion rule. Block and/or macroblock adaptive selection of motion prediction rules for direct mode is also referred to as "prediction adaptive direct modes". SKIP modes are a particular type of direct mode where no residual is coded.

Additionally, the term "neighbor" may refer to a block within or external to a super-block. For example, a neighboring block would be inside the super-block in the event where the super-block information is distributed within a four block super-block (such as in the case of super-block method B described herein below). Indeed, for example, the motion, super-block status, and so forth of a block in position (1, 1) in a super-block of four blocks, will normally be derived from the neighboring block context inside the (0, 0), (0, 1) & (1, 0) blocks of the super-block. The use of data from blocks outside of the super-block, for the case of method B described herein below, could be given when 2×1 or 1×2 size superblocks are used, or in the case of the method A described herein below, where all information is located in the (0, 0) block, but the second super-block of a 2×1 or 1×2 does not have any explicit syntax to this respect.

The phrase "adaptive tree-based frame partitioning" refers to a frame partitioning that uses a family of possible partitions where partitions size and spatial support have a parent-child relationship, and where depending on the location in the frame, the best partitioning size is selected. For example, consider a set of possible partitions with a given number of possible sizes and shapes. The bigger of the possible partitions can be represented as the union of a set of partitions from the immediately smaller size. At the same time, the partitions from the second size can be represented as the union of a set of partitions from a yet immediate smaller size. This relationship among partitions of different size may be repeated thorough all possible sizes in the set of possible partitions. Hence, adaptive tree-based frame partitioning would select for a given region to divide it with one "single partition" (e.g. the biggest available in the set of possible partitions), or to divide it with an ensemble of partitions whose union is a partition of the same size and shape as the "single partition". Then, "adaptive tree-based frame partitioning" can further decide whether each of the smaller partitions is left as a single partition, or it is further divided into an ensemble of partitions whose union is a partition of the same size and shape than the smaller single partition. Each one of the possible sizes of partitions is classified as a level of the tree of partitions.

The phrase "top-down tree partitioning" refers to a tree-based frame partitioning generated by recursive tree-based division of partitions.

The phrase "bottom-up tree joining" refers to a tree-based joining of partitions where partitions of a given tree level are joined in order to generate partitions of the upper tree level.

The phrase "mid-sized set of image blocks" refers to a set of partitions of an image in the form of blocks, where their size is a size somewhere between the image size itself, and a pixel size. In addition, the size of a block in a "mid-sized set of image blocks" is understood to be such that, in the event of a regular partition of an image with such blocks, at least more than one whole blocks can be embedded in such a partition.

Figure 3:
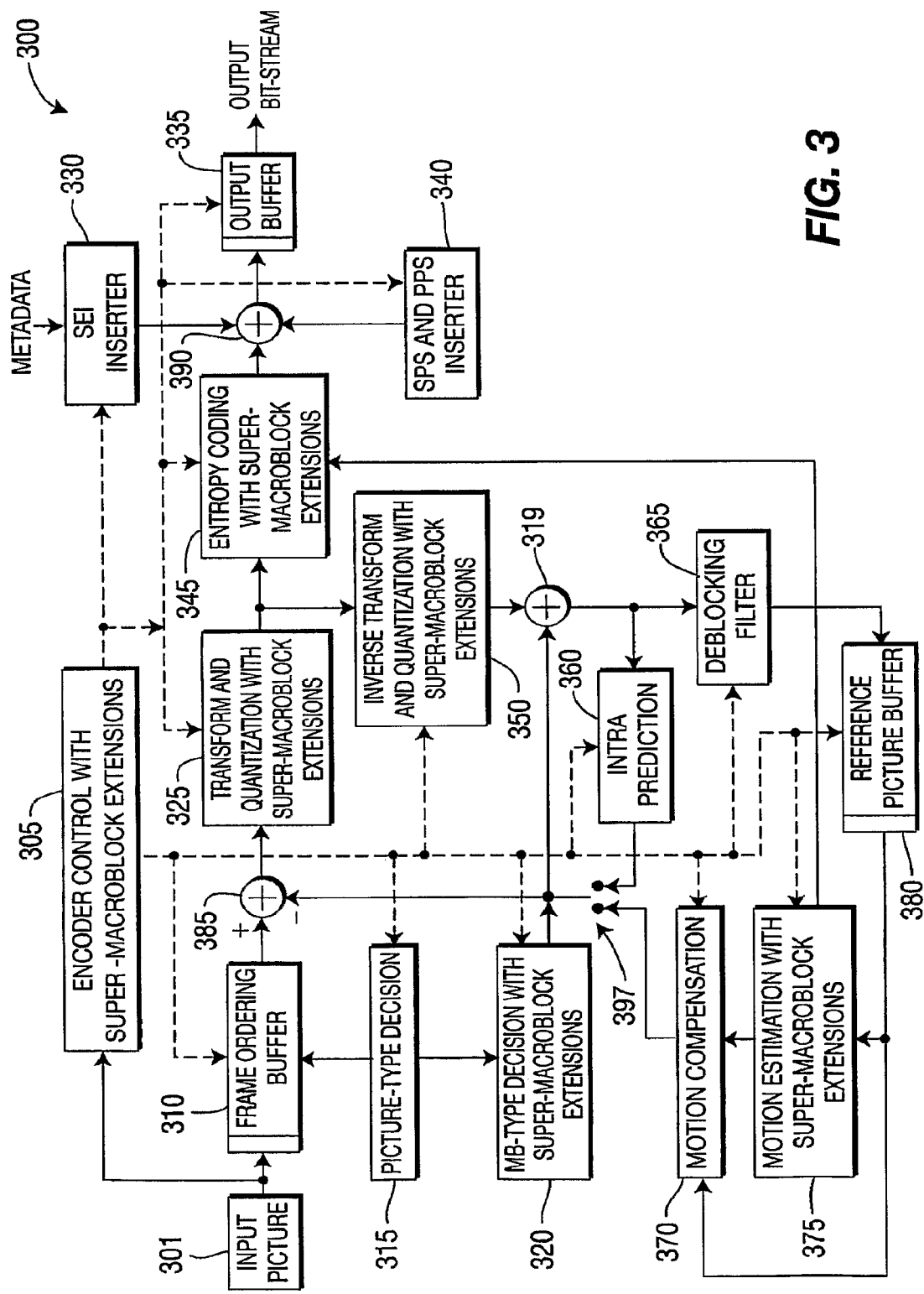
FIG. 3 shows a block diagram for a video encoder capable of performing video encoding in accordance with the MPEG-4 AVC Standard, modified and/or extended for use with the present principles, according to an embodiment of the present principles.

Turning to FIG. 3, an exemplary video encoder capable of performing video encoding in accordance with the MPEG-4 AVC Standard, modified and/or extended for use with the present principles, is indicated generally by the reference numeral 300.

The video encoder 300 includes a frame ordering buffer 310 having an output in signal communication with a non-inverting input of a combiner 385. An output of the combiner 385 is connected in signal communication with a first input of a transformer and quantizer with super-macroblock extensions 325. An output of the transformer and quantizer with super-macroblock extensions 325 is connected in signal communication with a first input of an entropy coder with super-macroblock extensions 345 and a first input of an inverse transformer and inverse quantizer with super-macroblock extensions 350. An output of the entropy coder with super-macroblock extensions 345 is connected in signal communication with a first non-inverting input of a combiner 390. An output of the combiner 390 is connected in signal communication with a first input of an output buffer 335.

A first output of an encoder controller with super-macroblock extensions 305 is connected in signal communication with a second input of the frame ordering buffer 310, a second input of the inverse transformer and inverse quantizer with super-macroblock extensions 350, an input of a picture-type decision module 315, an input of a macroblock-type (MB-type) decision module with super-macroblock extensions 320, a second input of an intra prediction module 360, a second input of a deblocking filter 365, a first input of a motion compensator 370, a first input of a motion estimator with super-macroblock extensions 375, and a second input of a reference picture buffer 380.

A second output of the encoder controller with super-macroblock extensions 305 is connected in signal communication with a first input of a Supplemental Enhancement Information (SEI) inserter 330, a second input of the transformer and quantizer with super-macroblock extensions 325, a second input of the entropy coder with super-macroblock extensions 345, a second input of the output buffer 335, and an input of the Sequence Parameter Set (SPS) and Picture Parameter Set (PPS) inserter 340.

A first output of the picture-type decision module 315 is connected in signal communication with a third input of a frame ordering buffer 310. A second output of the picture-type decision module 315 is connected in signal communication with a second input of a macroblock-type decision module with super-macroblock extensions 320.

An output of the Sequence Parameter Set (SPS) and Picture Parameter Set (PPS) inserter 340 is connected in signal communication with a third non-inverting input of the combiner 390.

An output of the inverse quantizer and inverse transformer with super-macroblock extensions 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator with super-macroblock extensions 375. A first output of the motion estimator with super-macroblock extensions 375 is connected in signal communication with a second input of the motion compensator 370. A second output of the motion estimator with super-macroblock extensions 375 is connected in signal communication with a third input of the entropy coder with super-macroblock extensions 345.

An output of the motion compensator 370 is connected in signal communication with a first input of a switch 397. An output of the intra prediction module 360 is connected in signal communication with a second input of the switch 397. An output of the macroblock-type decision module with super-macroblock extensions 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and with an inverting input of the combiner 385.

Inputs of the frame ordering buffer 310 and the encoder controller with super-macroblock extensions 305 are available as input of the encoder 300, for receiving an input picture 301. Moreover, an input of the Supplemental Enhancement Information (SEI) inserter 330 is available as an input of the encoder 300, for receiving metadata. An output of the output buffer 335 is available as an output of the encoder 300, for outputting a bitstream.

Turning to FIG. 4, an exemplary video decoder capable of performing video decoding in accordance with the MPEG-4 AVC Standard, modified and/or extended for use with the present principles, is indicated generally by the reference numeral 400.

The video decoder 400 includes an input buffer 410 having an output connected in signal communication with a first input of the entropy decoder with super-macroblock extensions 445. A first output of the entropy decoder with super-macroblock extensions 445 is connected in signal communication with a first input of an inverse transformer and inverse quantizer with super-macroblock extensions 450. An output of the inverse transformer and inverse quantizer with super-macroblock extensions 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder with super-macroblock extensions 445 is connected in signal communication with a third input of the motion compensator 470 and a first input of the deblocking filter 465. A third output of the entropy decoder with super-macroblock extensions 445 is connected in signal communication with an input of a decoder controller with super-macroblock extensions 405. A first output of the decoder controller with super-macroblock extensions 405 is connected in signal communication with a second input of the entropy decoder with super-macroblock extensions 445. A second output of the decoder controller with super-macroblock extensions 405 is connected in signal communication with a second input of the inverse transformer and inverse quantizer with super-macroblock extensions 450. A third output of the decoder controller with super-macroblock extensions 405 is connected in signal communication with a third input of the deblocking filter 465. A fourth output of the decoder controller with super-macroblock extensions 405 is connected in signal communication with a second input of the intra prediction module 460, with a first input of the motion compensator 470, and with a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

As noted above, the present principles are directed to method and systems for reduced resolution partitioning.

As noted above, state of the art video coders use adaptive block partitioning of video frames in order to best classify visual data for efficient coding. For this purpose, most coding algorithms initially divide each frame on a uniform grid of blocks of a given size. Then, depending on the video data, they further divide each block into smaller partitions in order to best adapt to it.

In accordance with various embodiments of the present principles, this aspect of the prior art is preserved (the ability to partition and sub-partition blocks into progressively smaller partitions) while also allowing, unlike the prior art, the ability to adaptively merge or group blocks into "super-macroblocks", by merging blocks from the initial uniform grid in the set of possible frame partitions, without needing major changes into the structure, architecture and/or coding tables of the decoder. In an embodiment, virtually bigger macroblocks are defined into video encoders/decoders by only inserting some small extra syntax signaling into the coded stream. As one feature in accordance with an embodiment, the decoder architecture uses the syntax in a way that allows such architecture to keep being based according to the size of the original initial block partition grid of video frames, while profiting from the use of super-macroblocks. This allows present video coding strategies, such as the MPEG-4 AVC Standard, to be easily extendable in order to introduce the use of the super-macroblocks (e.g. 32×32 blocks in the MPEG-4 AVC Standard, in order to have 32×32, 16×32, 32×16, 16×16, 16×8, 8×16, 8×8, 8×4, 4×8, 4×4 as possible partitions).

It is to be appreciated that the term "super-macroblocks" is used herein to refer to a block that is larger than the 16×16 block size (or macroblock) that is currently the largest available block size in the MPEG-4 AVC Standard, such larger block size being, for example, 32×32, 32×16, or 16×32, and which are created by forming hierarchical unions of blocks. Indeed, such created super-macroblocks may be rectangular and/or square.

Therefore, in an embodiment, a syntax-based approach is used in order to adaptively enable the use of bigger frame partitions by introducing relatively minor changes into the coding syntax, table and/or encoders/decoders, and without any significant change to the information and decoder architecture. In accordance with the embodiment, at the encoder, the image is initially partitioned into a set of mid-sized image blocks. Some of these mid-sized image blocks may then be further partitioned as desired, while others of these mid-sized image blocks may be grouped or merged into larger blocks. This adaptive approach enables a greater coding efficiency than was possible in other prior art systems.

The concept of grouping or merging mid-sized blocks into larger blocks can be seen as creating super-macroblocks. This allows the use, when desired, of frame partitions having a block size bigger than that defined for the initial frame partition grid in at least one of the block sides. In an embodiment, this is done by sending some extra bits in selected macroblocks. In an embodiment directed to the MPEG-4 AVC Standard, block modes with sizes smaller than 16×16 are not modified. Moreover, no extra partition modes are added to existing partition modes. Only some initial grid blocks may carry some extra information to signal bigger partitions such as 32×32, 16×32, 32×16, and so forth. This signaling, at the decoder side, is interpreted as selection data for indicating how (or whether) block mode types and/or motion are explicitly or implicitly predicted for coding, allowing the decoder to keep its architecture based on previous technologies, while enlarging its adaptive frame partitioning capacity.

Figure 5A:
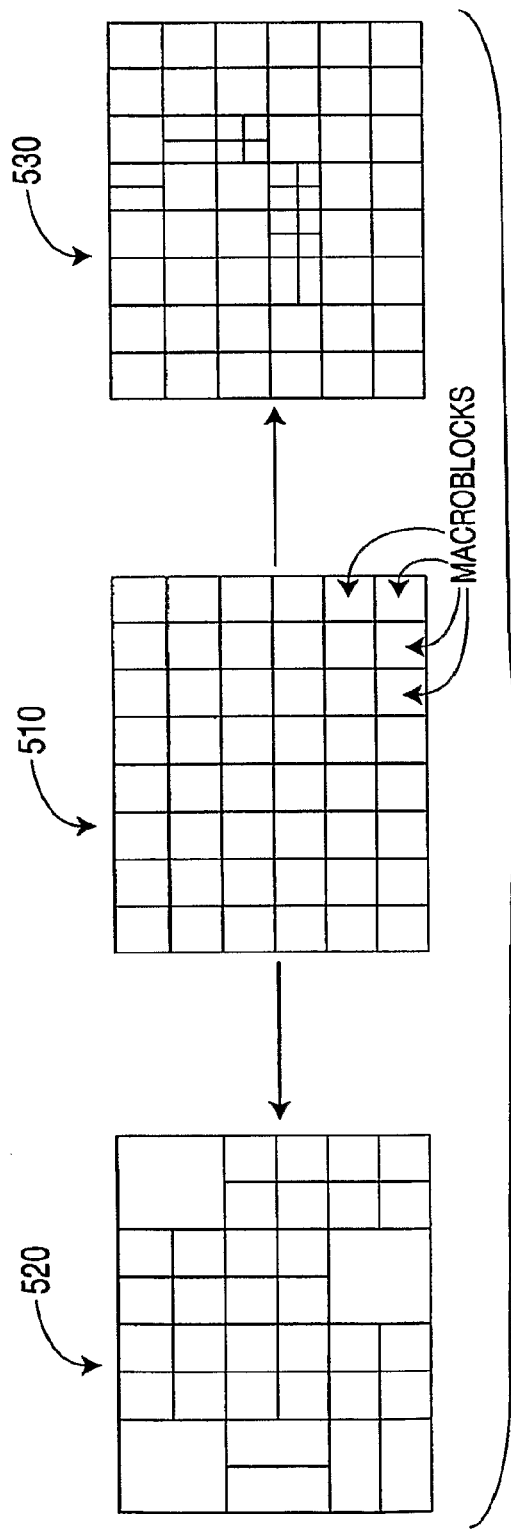
FIG. 5A shows a diagram for an exemplary initial macroblock partition, and corresponding bottom-up and top-down implementations, in accordance with an embodiment of the present principles.
Figure 5B:
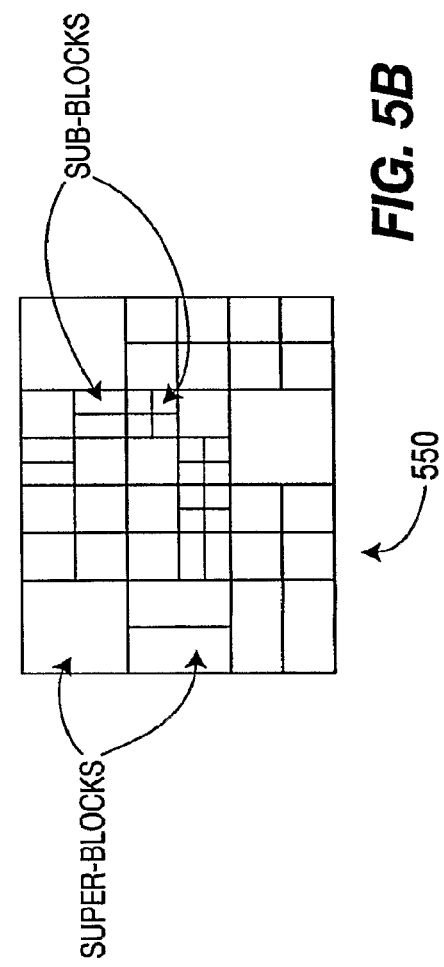
FIG. 5B shows a diagram for a combined super-block and sub-block tree-based partitioning for the macroblock partition of FIG. 5A, in accordance with an embodiment of the present principles.

Thus, embodiments of the present invention introduce the use of super-macroblocks (hierarchical unions of macroblocks) in order to enlarge the set of possible tree-based frame partitions for efficient video coding. The present principles allow any video coding approach, using macroblock-based frame partitioning, to create, in an efficient way, bigger square and/or rectangular partitions out of original macroblocks. Embodiments of the present invention thus present a way to manage tree-based frame partitioning (for example, in the style of the MPEG-4 AVC Standard), but where the initial frame partition grid, based on macroblocks, does not correspond to the biggest of the partitions from the tree. Hence, some of the partitions (sub-macroblock partitions) are generated in a top-down approach, by further partitioning each macroblock; and some of the partitions are generated in a bottom-up way, joining or merging some of the initial macroblock partitions. Turning to FIG. 5A, an exemplary initial macroblock partition, and corresponding bottom-up and top-down implementations, are indicated generally and respectively, by the reference numerals 510, 520, and 530. Turning to FIG. 5B, a combined super-block and sub-block tree-based partitioning for the macroblock partition of FIG. 5A is indicated generally by the reference numeral 550. In FIG. 5B, a final tree-based partitioning of a frame is formed by a joint set of super-blocks (and/or super-macroblocks), macroblocks and sub-blocks (and/or sub-macroblocks).

Embodiments of the present principles introduce some very small amount of side information into the coded stream in order to allow the decoder to see which blocks have been coded together in order to generate a super-block. By inserting some syntax information in selected blocks (and eventually some high syntax level), the decoder is able to understand that some neighboring blocks, to be decoded later, inherit part or all of the information decoded from the selected blocks. This "virtually" enables the use of super-block partitions. At the encoder side, this additional syntax information should be determined in order to use it for efficient coding purposes.

An embodiment of the present principles involves the modification of the use of Direct Prediction modes in order to be able to generate "virtual" super-block partitions while minimizing the impact into the architecture of any coding strategy that is using such kind of prediction modes. Direct prediction modes are motion compensation based prediction modes where motion information is not coded explicitly, but is rather inherited or implicitly derived from neighboring, already coded, partitions using some filter-based motion prediction, such as median filtering of motion vectors from neighboring blocks. In an example directed to the MPEG-4 AVC Standard, direct modes are used in Inter-B frames. Application of direct prediction has also been proposed for Inter-P frames. Spatial direct prediction modes use some neighboring-based motion derivation that is not aware of the structure and characteristics of the encoded video sequence. Instead of the approach related to spatial direct prediction modes, we propose eventually signaling, depending on the macroblock being encoded, its neighbors and/or the present state of the encoder/decoder, and some side information (syntax) in order to indicate which block or set of blocks are used, in order to derive motion information in a direct prediction mode (or modified direct prediction mode) and/or set of direct prediction modes (or modified set of prediction modes). Moreover, syntax can be designed such that macroblock mode-type information is also implicitly encoded in such syntax, sparing some additional bits. Hence, based on an extension of the direct prediction mode, an embodiment of the present principles introduces the use of bottom-up tree-based partitioning as a complement to the traditional (e.g., MPEG-4 AVC Standard based) top-down tree-based frame partitioning.

In the following we describe, in greater detail and based upon an extension of the MPEG-4 AVC Standard, several embodiments of syntax-based super-block frame partitioning. These exemplary embodiments focus on inserting virtual 32×32, 32×16, 16×32 super-block partition modes by using some new syntax and without introducing significant changes into the stream of data and the decoder. All of the embodiments profit from the nested structure of tree based bottom-up and top-down generated partitions.

Family of Methods A:

The Family of methods A is based on the insertion of additional syntax in selected, macroblock-size, prediction modes (e.g., P and/or B). This additional syntax indicates whether the neighboring macroblocks will inherit the properties of a prior encoded block or will instead be coded explicitly. In an embodiment, if neighboring macroblocks are selected to inherit the mode and motion properties from the prior encoded macroblock within the super-block, then these neighboring macroblocks are implicitly coded and no information at all (except for the coded motion compensation residual) needs to be coded. In an embodiment, when it is determined to encode one super-block, only one of its macroblocks needs to be encoded. Without loss of generality, in this particular embodiment, the macroblock explicitly encoded within a super-block will be the one placed at the upper-left corner of the super-block. Based on this convention, the coding/decoding scheme is defined such that only "super-block" related syntax at every upper-left macroblock, of a group of 4 macroblocks (those conforming to a 32×32 group) is to be sent. Moreover, only one macroblock at every super-block (by convention the upper-left one) partition must include explicit or implicit motion information. Implicit information refers to the motion information that is derived from neighboring data such as, for example, in the direct or skip mode cases.

Figure 6:
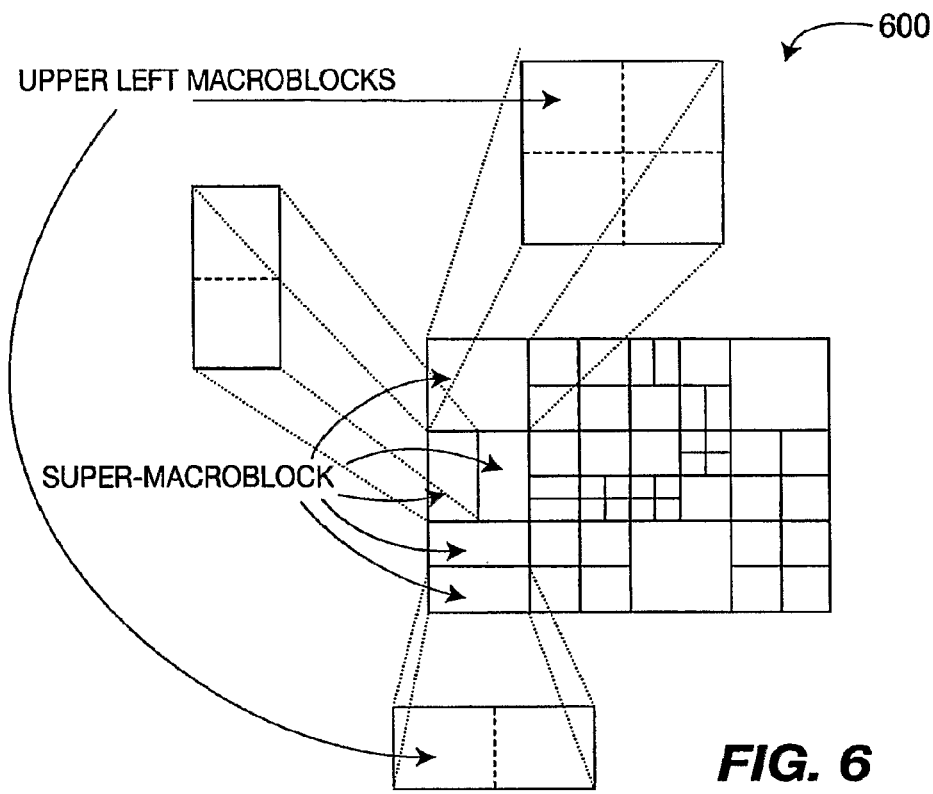
FIG. 6 shows a diagram for an example of super-macroblocks formed from a union of macroblocks, in accordance with an embodiment of the present principles.

Turning to FIG. 6, an example of super-macroblocks formed from a union of macroblocks is indicated generally by the reference numeral 600. As depicted in FIG. 6, 32×32 blocks include 4 macroblocks and 32×16 and 16×32 blocks include only 2 macroblocks. In the instant exemplary embodiment, upper-left macroblocks are also signaled in FIG. 6. Super-block syntax can be inserted in appropriate macroblocks after the macroblock mode type has been signaled into the coded information. For the tree-based partitions defined above, we only introduce super-block related syntax into 16×16 macroblocks for inter prediction or 16×16 macroblocks for direct prediction.

Let us give the following indexing of macroblocks according to their x and y coordinates, where the upper-left most macroblock in a frame has coordinates (0,0) and the lowest-right most macroblock in a frame has coordinates (M,N), where M and N are positive integer values. Then, super-block related information is eventually indicated at every macroblock with even coordinates (both). Hence, super-block related information is indicated for blocks at (0,0), (0,2), (2,0), (2,2), and so forth. At some point after macroblock mode type, if the mode type is suited for super-macroblock use, one flag (referred to herein as "super_block_enable") is transmitted (e.g., in an extension of the MPEG-4 AVC Standard, only those mode types related to 16×16 partitions would require explicit super block side information). Depending on its value, the group of 4 macroblocks represented by their even coordinate macroblock (upper-left macroblock) is, or is not, coded as one of the super-macroblock modes. In case it is not coded in any of the super-macroblock modes, no further information is encoded concerning the super-macroblock modes for this particular group of 4 macroblocks, and all macroblocks are coded as usually done (e.g., in the present embodiment, directed to the MPEG-4 AVC Standard). In case the super_block_enable flag indicates the use of a super-macroblock mode, then a codeword is transmitted in order to indicate which mode is used (32×32, 32×16 or 16×32). In another embodiment, a codeword or index is used to indicate the different super-block modes: (e.g., 0 (no super-block), 1 (32× 32), 2 (32×16), 3 (16×32)). Then, for example, the index can be encoded by Context adaptive Variable length coding (CAVLC) or Context adaptive binary arithmetic coding (CABAC).

Then, for each super-block, the upper-left macroblock is encoded using the usual syntax (with the eventual exception of the very small super-block related syntax). In the case of 32×32 super-blocks, motion compensation residual error is also encoded for the remaining 3 macroblocks. When 32×16 or 16×32 super-blocks are in use, appropriate upper-left macroblocks are encoded as usual (except for super-block related syntax), and for the rest of macroblocks, only the residual motion compensation error is encoded, with no further information, using the motion information derived from the appropriate upper-left macroblocks for signal prediction purposes.

The coding order of macroblocks from the original coding strategy (for example, in accordance with the MPEG-4 AVC Standard) is preserved (even for those where only residual motion compensation is transmitted).

At the encoder side, the fact that virtual regions, which are bigger than a macroblock, are signaled should be addressed. Hence, the encoder should retrieve the best and most efficient mode, globally, for the whole super-block, and encode the mode and prediction information in the upper-left macroblock of each super-block. In an embodiment, once the mode has been determined according to the global coding efficiency of the super-block, the remaining residual information for the non-coded macroblock(s) only needs to be encoded. In an embodiment, this is coded following the classic macroblock coding order, according to the MPEG-4 AVC Standard. As depicted with respect to FIGS. 1 and 3, blocks to be modified and/or extended are as follows. The encoder control is modified and/or extended, such that it handles the newly added syntax for super-macroblock partitions. The motion estimator is modified and/or extended, such that it exploits the fact that bigger partitions (bigger than a macroblock) can be signaled. Hence, motion and block mode need to be decided such as they are the best globally for the whole super-block. The entropy coder is modified and/or extended, such that it efficiently encodes the very little amount of information being transmitted for the super-macroblock related data.

Figure 2:
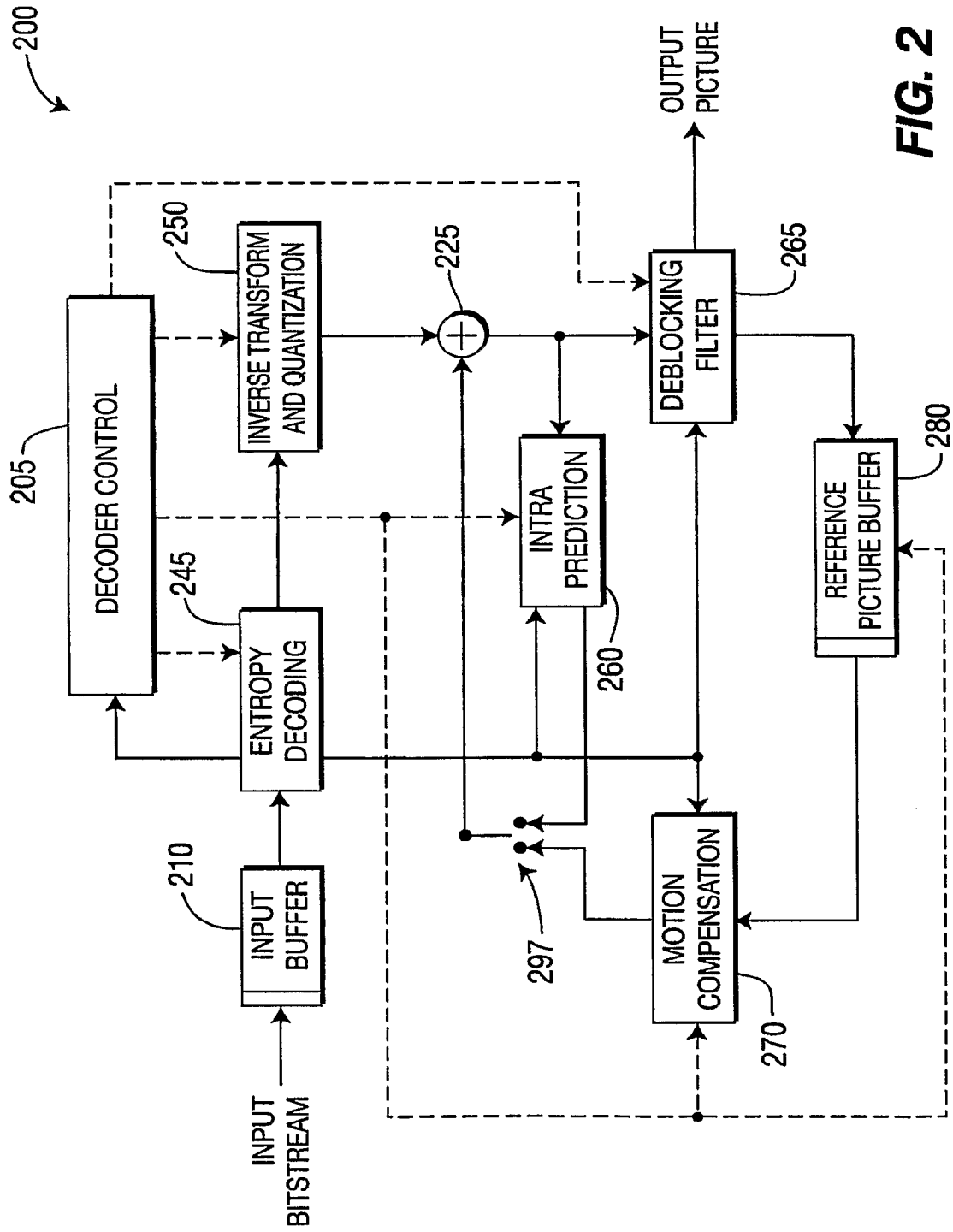
FIG. 2 shows a block diagram for a video decoder capable of performing video decoding in accordance with the MPEG-4 AVC Standard.

At the decoder side, the super-block related syntax is translated into direct mode prediction data, deriving the motion vector prediction according to the relationship among macroblocks established by super-block partitions. Hence, as depicted with respect to FIGS. 2 and 4, very few blocks are modified and/or extended to handle super-macroblock partitions, as follows. The entropy decoder is extended, such that it decodes the super-block related syntax encoded by the entropy coding module at the encoder. The decoder controller is modified and/or extended, such that it adds the decision steps related to the use of super-blocks (super-macroblocks). In order to allow all the rest of the modules to work as usual, the decoder controller sets the decoder data structures such that all other modules see the uncoded macroblocks, from the super-blocks, as direct modes with the appropriate motion derivation rule and the appropriate predicted motion information.

In accordance with an embodiment, at most 1 out of every 4 macroblocks include some super-block information. Indeed, only 16×16 inter-P/B and 16×16 direct-P/B modes with, positions (x,y) being both coordinates even, can carry super-block information. Of course, the present principles are not limited to the preceding and, thus, in other embodiments, more than 1 out of every 4 macroblocks (but preferably not all, although the case involving all macroblocks is also contemplated by the present principles) may include some super-block information.

Family of Methods B:

The Family of methods B is based on the insertion of additional syntax in selected, macroblock-size, direct prediction modes (e.g. P and/or B). In this family of methods, no other mode needs the insertion of additional information in order to signal super-macroblock partitions. In an exemplary embodiment incorporating these methods, upper-left macroblocks in groups of 4 macroblocks, i.e., macroblocks with even coordinates position (according to previous definition), do not carry, extra information nor syntax.

Super-macroblocks are signaled by means of some flag and/or codeword within the remaining 3 macroblocks from the group of 4 (i.e., the group that can form 32×32 super-blocks). Only direct mode blocks (P or B) need carry such flag and/or codeword. Any other mode used to code such 3 macroblocks directly implies that for that macroblock position there is no super-block (hence, no extra side information in any eventual direct mode would be needed in such a case). This means that the eventual flag and/or codeword inserted in direct modes explicitly indicates, depending on the context (i.e., macroblock position and/or neighbors) the neighbor (and/or neighbors) from whom to derive the motion vector/s for direct prediction.

The possible coding cases for super-block coding are as follows:

1. A macroblock with even coordinates is not a 16×16 predicted mode or a 16×16 direct prediction mode. Thus, no super-block coding is possible. No extra syntax will be sent for any of the other three macroblocks within the group of 4 generating a 32×32.
2. A macroblock with even coordinates is either a 16×16 predicted mode or a 16×16 direct prediction mode. Then, the following cases are possible, according to the raster scan order of the original coding technique (for example, in an embodiment, per the MPEG-4 AVC Standard). We presume also the relative coordinates (0,0), (0,1), (1,0), (1,1) for the group of four macroblocks that can form 32×32, 32×16 or 16×32 super-blocks, although embodiments using other coordinate systems are also possible, as is readily apparent to one of ordinary skill in this and related arts.
   a. If the macroblock under consideration is the (0,1) macroblock, (i.e., the right neighbor of the (0,0) macroblock) is not a 16×16 predicted mode or a 16×16 direct prediction mode, then no super-block mode is generated.
   b. If the (0,1) macroblock is a 16×16 predicted mode or a 16×16 direct prediction mode, then the following is possible:
      i. If (0,1) is a 16×16 predicted mode, then it means that 32×16 super-blocks can still be generated. The 16×16 predicted mode is coded as usual (for example, in an embodiment, per the MPEG-4 AVC Standard). Then, when the macroblock scanning order reaches the (1,0) and (1,1) neighbors, the following is enforced:
         1. if the macroblock scanning order reaches the (1,0) neighbor, (i.e., the neighbor below (0,0)), and this is not a 16×16 direct prediction mode, then no super-block mode is generated.
         2. if the (1,0) macroblock is a direct prediction mode, then there are two possibilities, signaled by means of an additional flag, e.g., super_block_enable, inserted somewhere after the macroblock type. Depending on the flag, this means that either it is part of a super-block (which means that 32×16 mode is enforced) or no super-block is generated. If 32×16 mode is enforced, then motion information is inherited from the (0,0) macroblock.
            a. No extra syntax needs to be encoded for the (1,1) block. It follows the decision of the (1,0) block. If a 32×16 super-block mode was decided, then it derives the motion information from the (0,1) block. Indeed the mode type can be coded implicitly; one only needs to encode the residual after motion compensation. Any classic mode can be used in (1,1) if super-block mode was disabled in (1,0).
      ii. If the (0,1) block is a 16×16 direct predicted mode, then there are two possibilities, signaled by means of an additional flag (e.g., super_block_enable) inserted somewhere after macroblock type. Depending on the flag, this means that either it is part of a super-block, then a 32×32 or 16×32 mode is coded, either is a regular direct mode, implying that at most, in that location, 32×16 mode can be generated. If it is part of a 32×32 or 16×32 super-block, then motion information is derived from (0,0). In the contrary situation, motion information is derived using the usual approach.
         1. if 32×32 or 16×32 mode was enabled in (0,1), then only 16×16 prediction or 16×16 direct modes are possible for (1,0).
            a. If a 16×16 direct prediction mode is selected in (1,0), a flag (e.g., 32×32_selection) is inserted somewhere after the macroblock type signaling. This indicates whether we are in a 32×32 super-block, hence deriving motion from (0,0), or whether it is a 16×32 mode (where motion is derived by some other means, e.g., as usually done in, for example, the direct mode of the MPEG-4 AVC Standard), direct prediction mode in (1,1) macroblock is coded implicitly, motion is derived depending on whether a 32×32 or 16×32 super-block is coded, and just transmitting the coded residual is required.
            b. If 16×16 prediction mode is selected for the (1,0) block, then 16×32 mode is used (without needing to transmit any further syntax). Direct prediction mode in the (1,1) macroblock is coded implicitly, motion is derived according to 16×32 super-block and just the transition of the coded residual is used.
         2. if a 32×16 mode was tentatively allowed for the (0,1) block, then the following is considered:
            a. if the (1,0) block is any mode other than a 16×16 direct prediction mode, then no super-block is coded.
            b. If the (1,0) block is a 16×16 direct prediction mode, then a flag (e.g. super_block_enable) indicates whether a 32×16 super-block is used, hence implying that motion is derived from the (0,0) neighbor. Direct prediction mode for the (1,1) macroblock is coded implicitly, motion is derived according to the 32×16 super-block and only the coded motion compensated residual may be transmitted.

Similar to the previous method (A), at the encoder side, one must handle the fact that virtual regions, bigger than a macroblock are signaled. Hence, in the instant embodiment, the encoder should retrieve the best and most efficient mode, globally, for the whole super-block, and encode the mode and prediction information according to the rules specified above for method B. Once the mode has been determined according to the global coding efficiency of the super-block, blocks are coded following the classic macroblock coding order (e.g., according to the MPEG-4 AVC Standard). However, some of the information now implicitly coded, is done according to the previously stated rules. As depicted with respect to FIGS. 1 and 3, blocks to be modified and/or extended are as follows.

The encoder controller is modified and/or extended, such that it handles the newly added syntax for super-macroblock partitions.

The motion Estimator is modified and/or extended, such that it exploits the fact that bigger partitions (bigger than a macroblock) can be signaled. Hence, motion and block mode need to be decided such as they are the best globally for the whole super-block.

The entropy coder is modified and/or extended, such that it efficiently encodes the very little amount of information being transmitted for the super-macroblock related data.

Optionally, the quantization step can also be modified and/or extended as well as the step for signaling regions with all-zero quantized coefficients, such that it is best adapted for efficient encoding of the residual, in terms of some distortion measure and cost measure, when super-macroblock partitions are in use. Indeed, in an embodiment involving an extension of the MPEG-4 AVC Standard with super-block coding would have also the coded block pattern functionalities extended, such that one can efficiently signal when the whole super-block has no quantized coefficients a to code or adaptively efficiently signal when part of the super-block does not have coefficients to code.

At the decoder side, the only procedure is to translate the super-block related syntax into direct mode prediction data, deriving the motion vector prediction according to the relationship among macroblocks established by super-block partitions. Hence, as depicted with respect to FIGS. 2 and 4, very few blocks are modified and/or extended to handle super-macroblock partitions as follows.

The entropy decoder is modified and/or extended, such that it decodes the super-block related syntax encoded by the entropy coding module at the encoder.

The decoder controller is modified and/or extended, such that it adds the few decision steps related to the use of super-blocks (super-macroblocks). In order to allow all the rest of the modules to work as usual, the decoder control module sets the decoder data structures such that all other modules see the uncoded (or implicitly encoded) macroblocks, from the super-blocks, as direct modes with the appropriate predicted motion information.

Optionally, the de-quantization step can also be modified and/or extended, such that it is best adapted for efficient encoding of the residual, matching the possible changes introduced at the encoder side.

TABLE 1 and TABLE 2 respectively show exemplary syntaxes for method A and method B to indicate the use of super-macroblocks.

TABLE 1

| macroblock_layer( ) { | C | Descriptor |
|---|---|---|
| if(mb_pos.xHor( )%2==0 && mb_pos.yVer( )%2==0){ | | |
|     mb_type | 2 | ue(v)\|ae(v) |
| }else{ | | |
|     if(get_mbdata(floor(mb_pos.yVer( )/2)*2, floor(mb_pos.xHor( )/2)*2).super_block_enable!=0 && (Is_32x32_mode \|\| (Is_upper_rightMB_in2x2MBgroup && Is_16x32_mode) \|\| (Is_lower_leftMB_in2x2MBgroup && Is_32x16_mode))){ /* or super_block_mode instead of super_block_enable*/ | | |
|         mb_type=DIRECT_MODE_x /*P or B*/ | | |
|     }else{ | | |
|         mb_type | 2 | ue(v)\|ae(v) |
|     } | | |
| } | | |
|     ... | | |
| if((mb_type==Inter_16x16 \|\| mb_type==Direct_Inter_16x16) && mb_pos.xHor( )%2==0 && mb_pos.yVer( )%2==0){ | | |
|     super_block_enable /*(or super_block_mode)*/ | | ue(v)\|ae(v) |
|     if(super_block_enable=1){ /*only if super_block_enable is used*/ | | |
|         super_block_mode | | ue(v)\|ae(v) |
|     } | | |
| } | | |
|     ... | | |
| } | | |

TABLE 2

| macroblock_layer( ) { | C | Descriptor |
|---|---|---|
| if(!can_mb_type_be_derived(mb_position,mb_super_block_neighbors)){ | | |
|     mb_type | 2 | ue(v)\|ae(v) |
| if(mb_type==DIRECT_MODE_x /*P or B*/ && mb_pos.xHor( )%2!=0 && mb_pos.yVer( )%2!=0){ | | |
|     if(mb_pos.xHor( )%2==0 && mb_pos.yVer( )%2!=1 && get_mbdata(floor(mb_pos.yVer( )/2)*2, floor(mb_pos.xHor( )/2)*2+1).super_block_enable!=0){ | | |
|         32x32_selection | | ue(v)\|ae(v) |
|     }else{ | | |
|         super_block_enable | | ue(v)\|ae(v) |
|     } | | |
| } | | |
| } | | |

TABLE 2-continued

```
macroblock_layer( ) {                                                 C  Descriptor
  else{
      mb_type=DIRECT_MODE_x /*P or B*/
      set_motion_predictor(mb_type, mb_super_block_neighbors,mb_position)
  }
  ...
}
```

Figure 7:
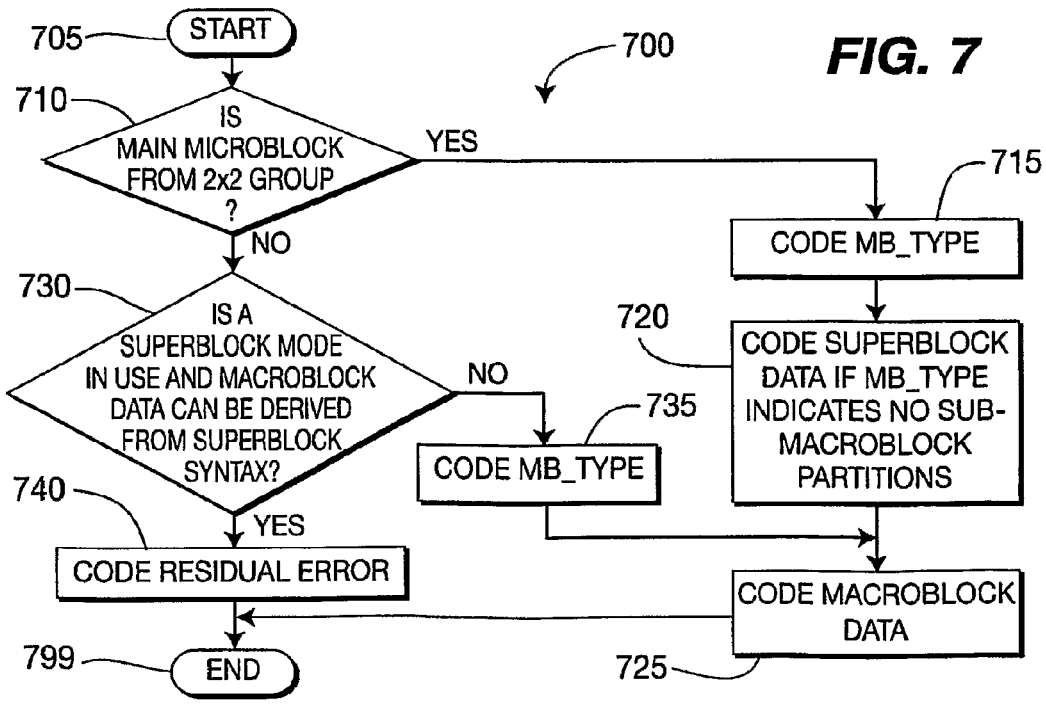
FIG. 7 shows a flow diagram for an exemplary method for encoding a macroblock in accordance with method A, according to an embodiment of the present principles.

Turning to FIG. 7, an exemplary method for encoding a macroblock in accordance with method A is indicated generally by the reference numeral 700.

The method 700 includes a start block 705 that passes control to a decision block 710. The decision block 710 determines whether or not the main macroblock is from a 2×2 group. If so, then control is passed to a function block 715. Otherwise, control is passed to a decision block 730.

The function block 715 codes the macroblock type (mb_type), and passes control to a function block 720. The function block 720 codes the super-block data if mb_type indicates no sub-macroblock partitions, and passes control to a function block 725. The function block 725 codes the macroblock data, and passes control to an end block 799.

The decision block 730 determines whether or not a super-block mode is in use and macroblock data can be derived from the super-block syntax. If so, the control is passed to a function block 740. Otherwise, control is passed to a function block 735.

The function block 740 codes the residual error, and passes control to the end block 799.

The function block 735 code the macroblock type (mb_type), and passes control to the function block 725.

Figure 8:
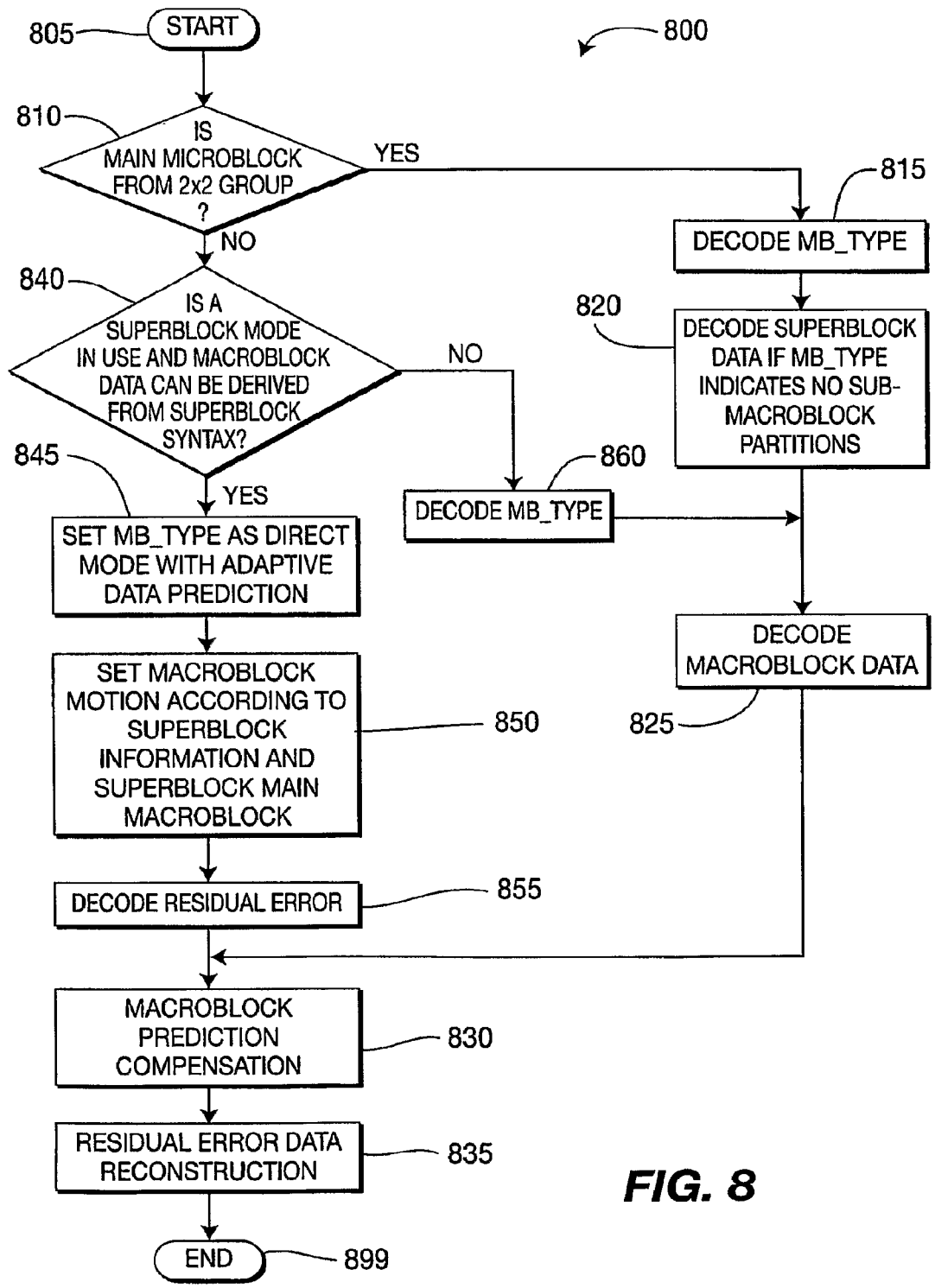
FIG. 8 shows a flow diagram for a method for decoding a macroblock in accordance with method A, according to an embodiment of the present principles.

Turning to FIG. 8, a method for decoding a macroblock in accordance with method A is indicated generally by the reference numeral 800.

The method 800 includes a start block 800 that passes control to a decision block 810. The decision block 810 determines whether or not the main macroblock is from a 2×2 group. If so, then control is passed to a function block 815. Otherwise, control is passed to a decision block 840.

The function block 815 decodes the macroblock type (mb_type), and passes control to a function block 820. The function block 820 decodes the super-block data if mb_type indicates no super-macroblock partitions, and passes control to a function block 825. The function block 825 decodes the macroblock data, and passes control to a function block 830.

The function block 830 performs macroblock prediction compensation, and passes control to a function block 835. The function block 835 performs residual error data construction, and passes control to an end block 899.

The decision block 840 determines whether or not a super-block mode is in use and macroblock data can be derived from the super-block syntax. If so, the control is passed to a function block 845. Otherwise, control is passed to a function block 860.

The function block 845 sets the macroblock type (mb_type) as direct mode with adaptive data prediction, and passes control to a function block 850. The function block 850 sets the macroblock motion according to the super-block information and super-block main macroblock, and passes control to a function block 855. The function block 855 decodes the residual error, and passes control to the function block 830.

Turning to FIG. 9, an exemplary method for encoding a macroblock in accordance with method B is indicated generally by the reference numeral 900.

The method 900 includes a start block 905 that passes control to a decision block 910. The decision block 910 checks by context and the previously encoded macroblock whether or not the present macroblock is part of a super-block and can be derived directly. If so, the control is passed to a function block 915. Otherwise, control is passed to a function block 920.

The function block 915 encodes the residual error data, and passes control to an end block 999.

The function block 920 encodes the macroblock type (mb_type), and passes control to a decision block 925. The decision block 925 determines whether or not the current mode is direct mode. If so, then control is passed to a function block 930. Otherwise, control is passed to a function block 935.

The function block 930 encodes the super-macroblock mode (e.g., any necessary super-block related flag if necessary), and passes control to the function block 915.

The function block 935 encodes the macroblock data, and passes control to the end block 999.

Figure 10:
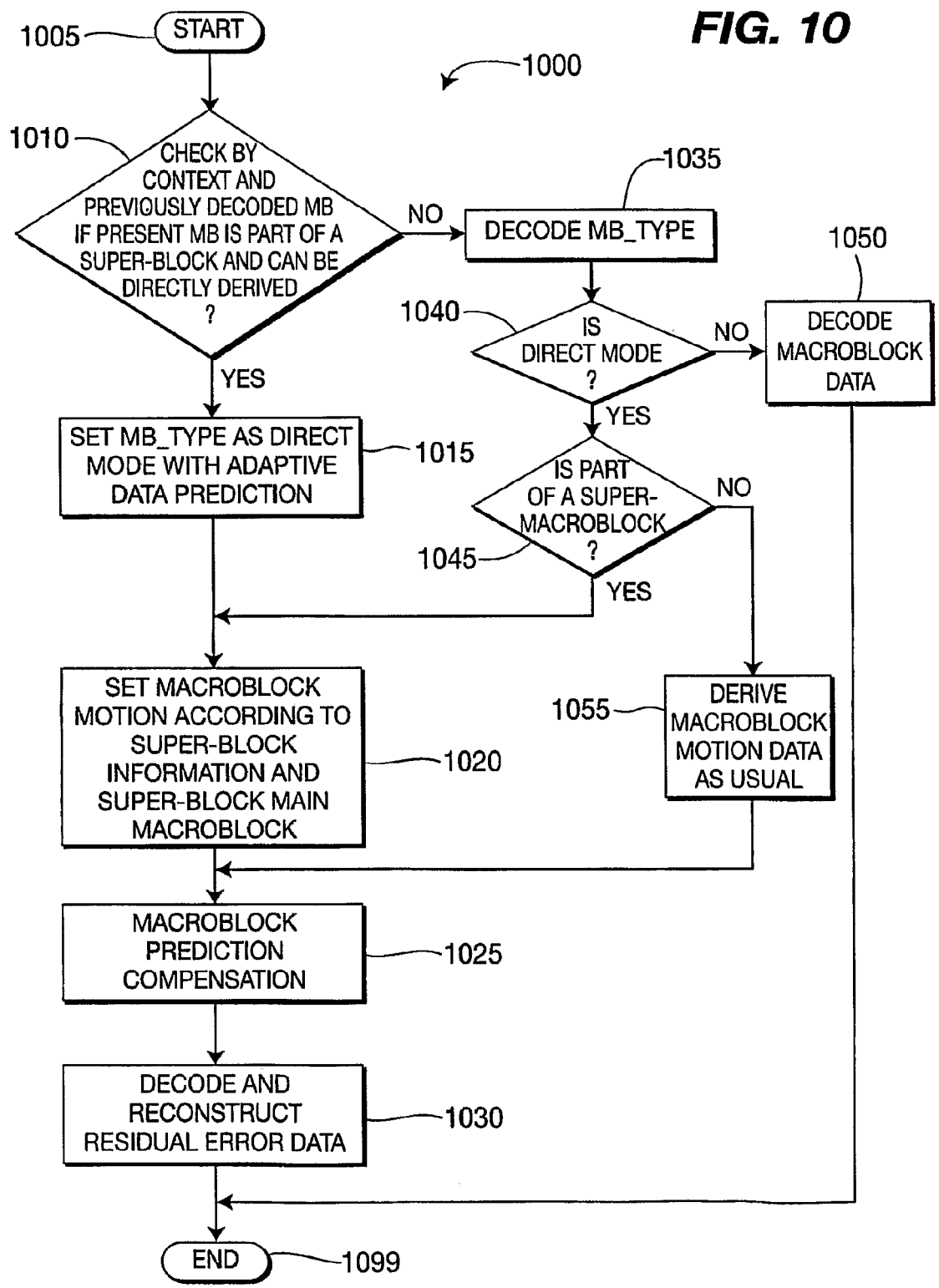
FIG. 10 shows a flow diagram for an exemplary method for decoding a macroblock in accordance with method B, according to an embodiment of the present principles.

Turning to FIG. 10, an exemplary method for decoding a macroblock in accordance with method B is indicated generally by the reference numeral 1000.

The method 1000 includes a start block 1005 that passes control to a decision block 1010. The decision block 1010 checks by context and the previously decoded macroblock whether or not the present macroblock is part of a super-block and can be directly derived. If so, the control is passed to a function block 1015. Otherwise, control is passed to a function block 1035.

The function block 1015 sets the macroblock type (mb_type) as direct mode with adaptive data prediction, and passes control to a function block 1020. The function block 1020 sets the macroblock motion according to the super-block information and super-block main macroblock, and passes control to a function block 1025. The function block 1025 performs macroblock prediction compensation, and passes control to a function block 1030. The function block 1030 decodes and reconstructs the residual error data, and passes control to an end block 1099.

The function block 1035 decodes the macroblock type (mb_type), and passes control to a decision block 1040. The decision block 1040 determines whether or not the current mode is direct mode. If so, then control is passed to a decision block 1045. Otherwise, control is passed to a function block 1050.

The decision block 1045 determines whether or not the current block is part of a super-macroblock. If so, then control is passed to the function block 1020. Otherwise, control is passed to a function block 1055. The function block 1055 derives the macroblock motion data as usual, and passes control to the function block 1025.

Turning to FIG. 11, an exemplary method for encoding video data using a two-pass encoder is indicated generally by the reference numeral 1100.

The method 1100 includes a start block 1105 that passes control to a function block 1110. The function block 1110 performs a first pass to encode the video data, e.g., based on the MPEG-4 AVC Standard, and passes control to a function block 1115. The function block 1115 performs a second pass including testing each 2×2, 2×1, and 1×2 macroblock group to determine whether or not it is more efficient to encode the same as a super-block, and passes control to a function block 1120. The function block 1120 inserts the appropriate super-block syntax in the macroblocks according to the second pass, and passes control to an end block 1199.

Turning to FIG. 12, an exemplary method for decoding video data is indicated generally by the reference numeral 1200.

The method 1200 includes a start block 1205 that passes control to a function block 1210. The function block 1210 parses the bitstream, and passes control to a function block 1215. The function block 1215 converts the super-block syntax into standard readable data (for example, based on the MPEG-4 AVC Standard in the concerned macroblocks, and passes control to a function block 1220. The function block 1220 performs standard decoding and video reconstruction, e.g., based on the MPEG-4 AVC Standard, and passes control to an end block 1299.

A description will now be given of some of the many attendant advantages/features of the present invention, some of which have been mentioned above. For example, one advantage/feature is an apparatus having an encoder for encoding an image by performing an initial partitioning of the image into a mid-sized set of image blocks, selecting some of the image blocks for further partitioning, and selecting others of the image blocks for merging. The further partitioning and the merging use adaptive tree-based frame partitioning.

Another advantage/feature is the apparatus having the encoder as described above, wherein partitions are obtained from a combination of top-down tree partitioning and bottom-up tree joining.

Yet another advantage/feature is the apparatus having the encoder wherein partitions are obtained from a combination of top-down tree partitioning and bottom-up tree joining as described above, wherein the encoder uses a block size of an initial partition to generate a tree-based frame partition, the block size being any of available block sizes capable of being used for tree-based frame partitioning relating to a particular video encoding standard or recommendation.

Moreover, another advantage/feature is the apparatus having the encoder wherein partitions are obtained from a combination of top-down tree partitioning and bottom-up tree joining as described above, wherein the encoder uses the bottom-up tree joining to generate super-block partitions for the video data.

Further, another advantage/feature is the apparatus having the encoder wherein the encoder uses the bottom-up tree joining to generate super-block partitions for the video data as described above, wherein the encoder generates any of 32×32, 16×32, 32×16 partitions from 16×16 macroblocks using the bottom up tree joining.

Also, another advantage/feature is the apparatus having the encoder wherein the encoder uses the bottom-up tree joining to generate super-block partitions for the video data as described above, wherein the encoder optimizes motion data in order to be globally efficient over an entire super-block.

Additionally, another advantage/feature is the apparatus having the encoder wherein partitions are obtained from a combination of top-down tree partitioning and bottom-up tree joining as described above, wherein the encoder selectively enables or disables at least one of the top-down tree partitioning and the bottom-up tree joining using a high level syntax.

Moreover, another advantage/feature is the apparatus having the encoder wherein the encoder selectively enables or disables at least one of the top-down tree partitioning and the bottom-up tree joining using a high level syntax as described above, wherein the encoder codes the high level syntax in at least one of a slice header level, a Supplemental Enhancement Information (SEI) level, a picture parameter set level, a sequence parameter set level, a network abstraction layer unit header level, a picture level, a slice level, and a macroblock level.

Further, another advantage/feature is the apparatus having the encoder wherein the encoder selectively enables or disables at least one of the top-down tree partitioning and the bottom-up tree joining using a high level syntax as described above, wherein the encoder at least one of implicitly and explicitly signals local super-block related information in at least one of a resultant bitstream corresponding to the video data and side information corresponding thereto.

Also, another advantage/feature is the apparatus having the encoder wherein the encoder at least one of implicitly and explicitly signals local super-block related information in at least one of a resultant bitstream corresponding to the video data and side information corresponding thereto as described above, wherein the encoder at least one of implicitly and explicitly signals the local super-block related information using at least one additional syntax element at a macroblock level.

Additionally, another advantage/feature is the apparatus having the encoder wherein the encoder at least one of implicitly and explicitly signals local super-block related information in at least one of a resultant bitstream corresponding to the video data and side information corresponding thereto as described above, wherein the local super-block related information comprises at least one of a super-block enable indication, a super-block disable indication, a super-block type, a super-block size, and a partition direction for a rectangular super-block.

Moreover, another advantage/feature is the apparatus having the encoder wherein the encoder at least one of implicitly and explicitly signals local super-block related information in at least one of a resultant bitstream corresponding to the video data and side information corresponding thereto as described above, wherein the local super-block related information is embedded into only one block of a super-block or is distributed among more than one block belonging to a same group of blocks that are comprised in the super-block.

Further, another advantage/feature is the apparatus having the encoder wherein the encoder at least one of implicitly and explicitly signals local super-block related information in at least one of a resultant bitstream corresponding to the video data and side information corresponding thereto as described above, wherein in at least one block in a super-block, at least one of block coding modes, the local super-block related information and motion information is directly derived for a current block to be encoded in the super-block from at least one of the local super-block related information, block mode information and motion information, explicitly or implicitly embedded in at least one neighboring block.

Also, another advantage/feature is the apparatus having the encoder wherein in at least one block in a super-block, at least one of block coding modes, the local super-block related information and motion information is directly derived for a current block to be encoded in the super-block from at least one of the local super-block related information, block mode information and motion information, explicitly or implicitly embedded in at least one neighboring block as described above, wherein derivation rules for deriving the at least one of the block coding modes, the local super-block related information and the motion information depend on a block scanning order.

Additionally, another advantage/feature is the apparatus having the encoder wherein the encoder at least one of implicitly and explicitly signals local super-block related information in at least one of a resultant bitstream corresponding to the video data and side information corresponding thereto as described above, wherein a block scanning order is equal or different from an existing block scan order imposed by a video coding recommendation or a video coding standard.

Moreover, another advantage/feature is the apparatus having the encoder wherein partitions are obtained from a combination of top-down tree partitioning and bottom-up tree joining as described above, wherein the encoder embeds at least one local super-block partition related syntax element into direct prediction modes, such that super-block frame partitioning is implemented based on adaptive direct prediction modes that allow different possible predictors to be used for the direct prediction modes.

Further, another advantage/feature is the apparatus having the encoder wherein the encoder embeds at least one local super-block partition related syntax element into direct prediction modes, such that super-block frame partitioning is implemented based on adaptive direct prediction modes that allow different possible predictors to be used for the direct prediction modes as described above, wherein the at least one local super-block partition related syntax element operates as an adaptive predictor selector for direct prediction, and wherein at least one of motion information and a block mode type is directly predicted or derived based on neighboring macroblock data and super-block syntax information.

Also, another advantage/feature is the apparatus having the encoder wherein partitions are obtained from a combination of top-down tree partitioning and bottom-up tree joining as described above, where residual coding is adapted to handle the super-block size using at least one of a super-block adapted transform size and super-block adapted signaling of at least one of coded quantized coefficients and non-coded quantized coefficients.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
   an encoder for encoding an image by performing an initial partitioning of the image into a mid-sized set of image blocks, selecting some of the image blocks for further partitioning, and selecting others of the image blocks for merging, wherein the further partitioning and the merging use adaptive tree-based frame partitioning,
   wherein the mid-sized set of image blocks are mid-sized with respect to two dimensions.

2. The apparatus of claim 1, wherein partitions are obtained from a combination of top-down tree partitioning and bottom-up tree joining.

3. The apparatus of claim 2, wherein said encoder uses a block size of an initial partition to generate a tree-based frame partition, the block size being any of available block sizes capable of being used for tree-based frame partitioning relating to a particular video encoding standard or recommendation.

4. The apparatus of claim 2, wherein said encoder uses the bottom-up tree joining to generate super-block partitions for the video data.

5. The apparatus of claim 4, wherein said encoder generates any of 32×32, 16×32, 32×16 partitions from 16×16 macroblocks using the bottom up tree joining.

6. The apparatus of claim 4, wherein said encoder optimizes motion data in order to be globally efficient over an entire super-block.

7. The apparatus of claim 2, wherein said encoder selectively enables or disables at least one of the top-down tree partitioning and the bottom-up tree joining using a high level syntax.

8. The apparatus of claim 7, wherein said encoder codes the high level syntax in at least one of a slice header level, a Supplemental Enhancement Information (SEI) level, a picture parameter set level, a sequence parameter set level, a network abstraction layer unit header level, a picture level, a slice level, and a macroblock level.

9. The apparatus of claim 7, wherein said encoder at least one of implicitly and explicitly signals local super-block related information in at least one of a resultant bitstream corresponding to the video data and side information corresponding thereto.

10. The apparatus of claim 9, wherein said encoder at least one of implicitly and explicitly signals the local super-block related information using at least one additional syntax element at a macroblock level.

11. The apparatus of claim 9, wherein the local super-block related information comprises at least one of a super-block enable indication, a super-block disable indication, a super-block type, a super-block size, and a partition direction for a rectangular super-block.

12. The apparatus of claim 9, wherein the local super-block related information is embedded into only one block of a super-block or is distributed among more than one block belonging to a same group of blocks that are comprised in the super-block.

13. The apparatus of claim 9, wherein in at least one block in a super-block, at least one of block coding modes, the local super-block related information and motion information is directly derived for a current block to be encoded in the super-block from at least one of the local super-block related information, block mode information and motion information, explicitly or implicitly embedded in at least one neighboring block.

14. The apparatus of claim 13, wherein derivation rules for deriving the at least one of the block coding modes, the local super-block related information and the motion information depend on a block scanning order.

15. The apparatus of claim 9, wherein a block scanning order is equal or different from an existing block scan order imposed by a video coding recommendation or a video coding standard.

16. The apparatus of claim 2, wherein said encoder embeds at least one local super-block partition related syntax element into direct prediction modes, such that super-block frame partitioning is implemented based on adaptive direct prediction modes that allow different possible predictors to be used for the direct prediction modes.

17. The apparatus of claim 16, wherein the at least one local super-block partition related syntax element operates as an adaptive predictor selector for direct prediction, and wherein at least one of motion information and a block mode type is directly predicted or derived based on neighboring macroblock data and super-block syntax information.

18. The apparatus of claim 2, where residual coding is adapted to handle the super-block size using at least one of a super-block adapted transform size and super-block adapted signaling of at least one of coded quantized coefficients and non-coded quantized coefficients.

19. In a video encoder, a method, comprising:
encoding an image by performing an initial partitioning of the image into a mid-sized set of image blocks, selecting some of the image blocks for further partitioning, and selecting others of the image blocks for merging, wherein the further partitioning and the merging use adaptive tree-based frame partitioning,
wherein the mid-sized set of image blocks are mid-sized with respect to two dimensions.

20. The method of claim 19, wherein partitions are obtained from a combination of top-down tree partitioning and bottom-up tree joining.

21. The method of claim 20, wherein said encoding step uses a block size of an initial partition to generate a tree-based frame partition, the block size being any of available block sizes capable of being used for tree-based frame partitioning relating to a particular video encoding standard or recommendation.

22. The method of claim 20, wherein said encoding step uses the bottom-up tree joining to generate super-block partitions for the video data.

23. The method of claim 22, wherein said encoding step generates any of 32×32, 16×32, 32×16 partitions from 16×16 macroblocks using the bottom up tree joining.

24. The method of claim 22, wherein said encoding step optimizes motion data in order to be globally efficient over an entire super-block.

25. The method of claim 20, wherein said encoding step selectively enables or disables at least one of the top-down tree partitioning and the bottom-up tree joining using a high level syntax.

26. The method of claim 25, wherein said encoding step codes the high level syntax in at least one of a slice header level, a Supplemental Enhancement Information (SEI) level, a picture parameter set level, a sequence parameter set level, a network abstraction layer unit header level, a picture level, a slice level, and a macroblock level.

27. The method of claim 25, wherein said encoding step at least one of implicitly and explicitly signals local super-block related information in at least one of a resultant bitstream corresponding to the video data and side information corresponding thereto.

28. The method of claim 27, wherein said encoding step explicitly signals the local super-block related information using at least one additional syntax element at a macroblock level.

29. The method of claim 27, wherein the local super-block related information comprises at least one of a super-block enable indication, a super-block disable indication, a super-block type, a super-block size, and a partition direction for a rectangular super-block.

30. The method of claim 27, wherein the local super-block related information is embedded into only one block of a super-block or is distributed among more than one block belonging to a same group of blocks that are comprised in the super-block.

31. The method of claim 27, wherein in at least one block in a super-block, at least one of block coding modes, the local super-block related information and motion information is directly derived for a current block to be encoded in the super-block from at least one of the local super-block related information, block mode information and motion information, explicitly or implicitly embedded in at least one neighboring block.

32. The method of claim 31, wherein derivation rules for deriving the at least one of the block coding modes, the local super-block related information and the motion information depend on a block scanning order.

33. The method of claim 27, wherein a block scanning order is equal or different from an existing block scan order imposed by a video coding recommendation or a video coding standard.

34. The method of claim 20, wherein said encoding step embeds at least one local super-block partition related syntax element into direct prediction modes, such that super-block frame partitioning is implemented based on adaptive direct prediction modes that allow different possible predictors to be used for the direct prediction modes.

35. The method of claim 34, wherein the at least one local super-block partition related syntax element operates as an adaptive predictor selector for direct prediction, and wherein at least one of motion information and a block mode type is directly predicted or derived based on neighboring macroblock data and super-block syntax information.

36. The method of claim 20, where residual coding is adapted to handle the super-block size using at least one of a super-block adapted transform size, and super-block adapted signaling of at least one of coded quantized coefficients and non-coded quantized coefficients.

37. An apparatus, comprising:
a decoder for decoding an image by performing an initial partitioning of the image into a mid-sized set of image blocks, selecting some of the image blocks for further partitioning, and selecting others of the image blocks for merging, wherein the further partitioning and the merging use adaptive tree-based frame partitioning,
wherein the mid-sized set of image blocks are mid-sized with respect to two dimensions.

38. The apparatus of claim 37, wherein partitions are obtained from a combination of top-down tree partitioning and bottom-up tree joining.

39. The apparatus of claim 38, wherein said decoder uses a block size of an initial partition to generate a tree-based frame partition, the block size being any of available block sizes capable of being used for tree-based frame partitioning relating to a particular video decoding standard or recommendation.

40. The apparatus of claim 38, wherein said decoder uses the bottom-up tree joining to generate super-block partitions for the video data.

41. The apparatus of claim 40, wherein said decoder generates any of 32×32, 16×32, 32×16 partitions from 16×16 macroblocks using the bottom up tree joining.

42. The apparatus of claim 38, wherein said decoder decodes at least one high level syntax element to selectively enable or disable at least one of the top-down tree partitioning and the bottom-up tree joining.

43. The apparatus of claim 42, wherein said decoder decodes the high level syntax in at least one of a slice header level, a Supplemental Enhancement Information (SEI) level, a picture parameter set level, a sequence parameter set level, a network abstraction layer unit header level, a picture level, a slice level, and a macroblock level.

44. The apparatus of claim 42, wherein said decoder at least one of implicitly and explicitly decodes local super-block related information from at least one of a resultant bitstream corresponding to the video data and side information corresponding thereto.

45. The apparatus of claim 44, wherein said decoder at least one of implicitly and explicitly decodes the local super-block related information by decoding at least one additional syntax element at a macroblock level.

46. The apparatus of claim 44, wherein the local super-block related information comprises at least one of a super-block enable indication, a super-block disable indication, a super-block type, a super-block size, and a partition direction for a rectangular super-block.

47. The apparatus of claim 44, wherein the at least one additional syntax element is decoded from only one block of a super-block or from a distribution from among more than one block belonging to a same group of blocks that are comprised in the super-block.

48. The apparatus of claim 44, wherein in at least one block in a super-block, at least one of block coding modes, the local super-block related information and motion information is directly derived for a current block to be encoded in the super-block from at least one of the local super-block related information, block mode information and motion information, explicitly or implicitly embedded in at least one neighboring block.

49. The apparatus of claim 48, wherein derivation rules for deriving the at least one of the block coding modes, the local super-block related information and the motion information depend on a block scanning order.

50. The apparatus of claim 44, wherein a block scanning order is equal or different from an existing block scan order imposed by a video coding recommendation or a video coding standard.

51. The apparatus of claim 38, wherein said decoder decodes at least one local super-block partition related syntax element from direct prediction modes, such that super-block frame partitioning is implemented based on adaptive direct prediction modes that allow different possible predictors to be used for the direct prediction modes.

52. The apparatus of claim 51, wherein the at least one local super-block partition related syntax element operates as an adaptive predictor selector for direct prediction, and wherein at least one of motion information and a block mode type is directly predicted or derived based on neighboring macroblock data and super-block syntax information.

53. The apparatus of claim 38, where residual decoding is adapted to handle the super-block size using at least one of a super-block adapted transform size, and super-block adapted signaling of at least one of coded quantized coefficients and non-coded quantized coefficients.

54. In a video decoder, a method, comprising:
decoding an image by performing an initial partitioning of the image into a mid-sized set of image blocks, selecting some of the image blocks for further partitioning, and selecting others of the image blocks for merging, wherein the further partitioning and the merging use adaptive tree-based frame partitioning,
wherein the mid-sized set of image blocks are mid-sized with respect to two dimensions.

55. The method of claim 54, wherein partitions are obtained from a combination of top-down tree partitioning and bottom-up tree joining.

56. The method of claim 55, wherein said decoding step uses a block size of an initial partition to generate a tree-based frame partition, the block size being any of available block sizes capable of being used for tree-based frame partitioning relating to a particular video decoding standard or recommendation.

57. The method of claim 55, wherein said decoding step uses the bottom-up tree joining to generate super-block partitions for the video data.

58. The method of claim 57, wherein said decoding step generates any of 32×32, 16×32, 32×16 partitions from 16×16 macroblocks using the bottom up tree joining.

59. The method of claim 55, wherein said decoding step decodes at least one high level syntax element to selectively enable or disable at least one of the top-down tree partitioning and the bottom-up tree joining.

60. The method of claim 59, wherein said decoding step decodes the high level syntax from at least one of a slice header level, a Supplemental Enhancement Information (SEI) level, a picture parameter set level, a sequence parameter set level, a network abstraction layer unit header level, a picture level, a slice level, and a macroblock level.

61. The method of claim 55, wherein said decoding step at least one of implicitly and explicitly decodes local super-block related information from at least one of a resultant bitstream corresponding to the video data and side information corresponding thereto.

62. The method of claim 61, wherein said decoding step at least one of implicitly and explicitly decodes the local super-block related information by decoding at least one additional syntax element at a macroblock level.

63. The method of claim 61, wherein the local super-block related information comprises at least one of a super-block enable indication, a super-block disable indication, a super-block type, a super-block size, and a partition direction for a rectangular super-block.

64. The method of claim 61, wherein the at least one additional syntax element is decoded from only one block of a super-block or from a distribution from among more than one block belonging to a same group of blocks that are comprised in the super-block.

65. The method of claim 61, wherein the at least one additional syntax element selectively signals whether the local super-block related information is to be inherited by at least one neighboring block with respect to a previously coded block corresponding to the local super-block related information, and wherein at least one of block coding modes and motion information of the at least one neighboring block is directly derived from the at least one additional syntax element to allow direct decoding of the at least one of the block coding modes and the motion information of the at least one neighboring block.

66. The method of claim 65, wherein derivation rules for deriving the at least one of the block coding modes, the local super-block related information and the motion information depend on a block scanning order.

67. The method of claim 61, wherein a block scanning order is equal or different from an existing block scan order imposed by a video coding recommendation or a video coding standard.

68. The method of claim 55, wherein said decoding step decodes at least one local super-block partition related syntax element from direct prediction modes, such that super-block frame partitioning is implemented based on adaptive direct prediction modes that allow different possible predictors to be used for the direct prediction modes.

69. The method of claim 68, wherein the at least one local super-block partition related syntax element operates as an adaptive predictor selector for direct prediction, and wherein at least one of motion information and a block mode type is directly predicted or derived based on neighboring macroblock data and super-block syntax information.

70. The method of claim 39, where residual decoding is adapted to handle the super-block size using at least one of a super-block adapted transform size, and super-block adapted signaling of at least one of coded quantized coefficients and non-coded quantized coefficients.

71. A non-transitory storage media having video signal data encoded thereupon, comprising:
an image encoded by performing an initial partitioning of the image into a mid-sized set of image blocks, selecting some of the image blocks for further partitioning, and selecting others of the image blocks for merging,
wherein the mid-sized set of image blocks are mid-sized with respect to two dimensions.

* * * * *